US012021307B2

(12) United States Patent
Kim et al.

(10) Patent No.: US 12,021,307 B2
(45) Date of Patent: Jun. 25, 2024

(54) STRUCTURE OF COUPLER FOR ANTENNA MODULE AND ELECTRONIC DEVICE INCLUDING SAME

(71) Applicant: Samsung Electronics Co., Ltd., Suwon-si (KR)

(72) Inventors: Hyunjin Kim, Suwon-si (KR); Yonghun Cheon, Suwon-si (KR); Jungyub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 17/753,468

(22) PCT Filed: Sep. 3, 2020

(86) PCT No.: PCT/KR2020/011804
§ 371 (c)(1),
(2) Date: Mar. 3, 2022

(87) PCT Pub. No.: WO2021/045512
PCT Pub. Date: Mar. 11, 2021

(65) Prior Publication Data
US 2022/0368025 A1    Nov. 17, 2022

(30) Foreign Application Priority Data
Sep. 3, 2019    (KR) .................. 10-2019-0109027

(51) Int. Cl.
*H01Q 21/06*    (2006.01)
*H01Q 21/00*    (2006.01)
(52) U.S. Cl.
CPC ....... *H01Q 21/061* (2013.01); *H01Q 21/0075* (2013.01)

(58) Field of Classification Search
CPC ...... H01Q 1/2283; H01Q 1/243; H01Q 1/246; H01Q 1/526; H01Q 3/267; H01Q 21/061; H01Q 21/0075; H01Q 21/28
See application file for complete search history.

(56) References Cited

U.S. PATENT DOCUMENTS 4,069,483 A    1/1978  Kaloi
6,597,318 B1   7/2003  Parsche et al.
(Continued)

FOREIGN PATENT DOCUMENTS

DE    3318520 A1    4/1984
EP    0639902 A1    2/1995
(Continued)

OTHER PUBLICATIONS

International Search Report and Written Opinion of the International Searching Authority in connection with International Application No. PCT/KR2020/011804 dated Dec. 17, 2020, 11 pages.
(Continued)

*Primary Examiner* — Hoang V Nguyen

(57) ABSTRACT

The present disclosure relates to a 5th generation (5G) or pre-5G communication system for supporting a higher data transmission rate after a 4th generation (4G) communication system such as long-term evolution (LTE). The present disclosure relates to an antenna device, and the antenna device may include an antenna board including a plurality of antenna elements and a coupler for extracting part of a signal transmitted to the plurality of antenna elements, and a calibration board disposed under the antenna board, and including a correction circuit for correcting an error using the part of the signal extracted by the coupler, the coupler may include a first transmission line connected with the plurality of antenna elements, and a second transmission line disposed to be capacitively connected with the first transmission line, and the second transmission line may
(Continued)

include a third transmission line and a fourth transmission line spaced apart from each other to be parallel to the first transmission line based on the first transmission line, and a fifth transmission line disposed to connect with the third transmission line and the fourth transmission line with respective terminal ends, and to surround a via hole penetrating the antenna board in a vertical direction.

15 Claims, 39 Drawing Sheets

(56) References Cited

U.S. PATENT DOCUMENTS

| | | | |
|---|---|---|---|
| 7,305,223 | B2 | 12/2007 | Liu et al. |
| 10,164,334 | B2 | 12/2018 | Kareisto et al. |
| 2003/0076191 | A1 | 4/2003 | Iida et al. |
| 2005/0258917 | A1 | 11/2005 | Hubert |
| 2016/0248141 | A1 | 8/2016 | Fujiwara et al. |
| 2017/0317396 | A1 | 11/2017 | Srirattana et al. |
| 2018/0191050 | A1 | 7/2018 | Zhang et al. |
| 2018/0316092 | A1 | 11/2018 | Cai et al. |
| 2019/0267701 | A1* | 8/2019 | Kim .................. H01Q 21/28 |
| 2021/0336659 | A1 | 10/2021 | Kim et al. |

FOREIGN PATENT DOCUMENTS

| | | |
|---|---|---|
| JP | 2000-101341 A | 4/2000 |
| JP | 2014-239550 A | 12/2014 |
| KR | 10-2010-0018648 A | 2/2010 |
| KR | 10-2015-0010148 A | 1/2015 |
| KR | 10-1855133 B1 | 5/2018 |

OTHER PUBLICATIONS

European Patent Office, "Supplementary European Search Report," dated Jul. 10, 2022, in connection with European Patent Application No. EP20861071.7, 9 pages.

Korean Intellectual Property Office, "Notice of Preliminary Rejection," dated Jul. 20, 2022, in connection with Korean Patent Application No. KR10-2019-0109027, 10 pages.

Notice of Patent Grant dated Oct. 13, 2022 in connection with Korean Patent Application No. 10-2019-0109027, 3 pages.

* cited by examiner

STRUCTURE OF COUPLER FOR ANTENNA MODULE AND ELECTRONIC DEVICE INCLUDING SAME

CROSS-REFERENCE TO RELATED APPLICATIONS

This application is a 371 of International Application No. PCT/KR2020/011804, filed Sep. 3, 2020, which claims priority to Korean Patent Application No. 10-2019-0109027, filed Sep. 3, 2019, the disclosures of which are herein incorporated by reference in their entirety.

BACKGROUND

1. Field

The present disclosure generally relates to a structure of a coupler for an antenna module and an electronic device including the same.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FOAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

A product equipped with a plurality of antennas is being developed to increase communication performance, and equipment having more antennas is expected to be used by utilizing the massive MIMO technology. In addition, as signals of the extremely high frequency are transmitted and received in the 5G system, antenna module structures for improving the communication performance using the extremely high frequency signals are being studied

SUMMARY

Based on the discussions described above, the present disclosure provides a structure of a coupler for an antenna module and an electronic device including the same in a wireless communication system.

In addition, the present disclosure provides a structure of a coupler for reducing signal loss and a coupler size and an electronic device including the same in a wireless communication system.

In addition, the present disclosure provides a structure for providing isolation between couplers and an electronic device including the same in a wireless communication system.

According to various embodiments of the present disclosure, an antenna device in a wireless communication system may include an antenna board including a plurality of antenna elements and a coupler for extracting part of a signal transmitted to the plurality of the antenna elements, and a calibration board disposed under the antenna board, and including a correction circuit for correcting an error using the part of the signal extracted by the coupler, the coupler may include a first transmission line connected with the plurality of the antenna elements, and a second transmission line disposed to be capacitively connected with the first transmission line, and the second transmission line may include a third transmission line and a fourth transmission line spaced apart from each other to be parallel to the first transmission line based on the first transmission line, and a fifth transmission line disposed to connect with the third transmission line and the fourth transmission line with respective terminal ends, and to surround a via hole penetrating the antenna board in a vertical direction.

According to various embodiments of the present disclosure, an electronic device in a wireless communication system may include at least one processor and an antenna device, the antenna device may include an antenna board including a plurality of antenna elements and a coupler for extracting part of a signal delivered to the plurality of the antenna elements, and a calibration board disposed under the antenna board, and including a correction circuit for correcting an error using the part of the signal extracted by the coupler, the coupler may include a first transmission line connected with the plurality of the antenna elements, and a second transmission line disposed to be capacitively connected with the first transmission line, and the second transmission line may include a third transmission line and a fourth transmission line spaced apart from each other to be parallel to the first transmission line based on the first transmission line, and a fifth transmission line disposed to connect with the third transmission line and the fourth transmission line with respective terminal ends, and to surround a via hole penetrating the antenna board in a vertical direction.

Devices according to various embodiments of the present disclosure may reduce insertion loss of signals radiated by an antenna and concurrently reduce interference between an antenna board and a calibration board.

Effects obtainable from the present disclosure are not limited to the above-mentioned effects, and other effects which are not mentioned may be clearly understood by those skilled in the art of the present disclosure through the following descriptions.

DETAILED DESCRIPTION

Terms used in the present disclosure are only used to describe specific embodiments, and may not be intended to limit the scope of other embodiments. Singular expressions may include plural expressions unless the context clearly indicates otherwise. Terms used herein, including technical or scientific terms, may have the same meaning as commonly understood by a person of ordinary skill in the technical field described in the present disclosure. Among the terms used in the present disclosure, terms defined in a general dictionary may be interpreted as having the same or similar meanings as those in the context of the related art, and unless explicitly defined in the present disclosure, may not be interpreted as ideal or excessively formal meanings. In some cases, even terms defined in the present disclosure may not be interpreted to exclude embodiments of the present disclosure.

Various embodiments of the present disclosure described below describe a hardware approach by way of example. However, various embodiments of the present disclosure include a technology using both hardware and software, and thus the various embodiments of the present disclosure may not exclude a software-based approach.

Hereafter, the present disclosure relates to a coupler structure for an antenna module and an electronic device including the same in a wireless communication system. Specifically, the present disclosure explains a technique for forming an efficient antenna structure in terms of performance, space, and cost, by means of the coupler structure in which a length of a coupler line is reduced.

Terms indicating components of an electronic device (e.g., a filter, a coupler, an antenna array, a feeding network, a calibration network, a transmission layer, etc.), terms indicating component shapes, terms indicating circuits, terms indicating ports (e.g., an antenna port, a coupler port, an isolation port, a filter port), terms indicating lines constructing a coupler (e.g., a main path, a sub path) and the like used in the following explanations are provided as examples for convenience of description. Hence, the present disclosure is not limited to the terms to be described, and other terms having the same technical meaning may be used. In addition, terms such as ' . . . unit', ' . . . device', ' . . . material, ' . . . body' used in the following may indicate at least one shape structure or may indicate a unit for processing a function.

Figure 1:
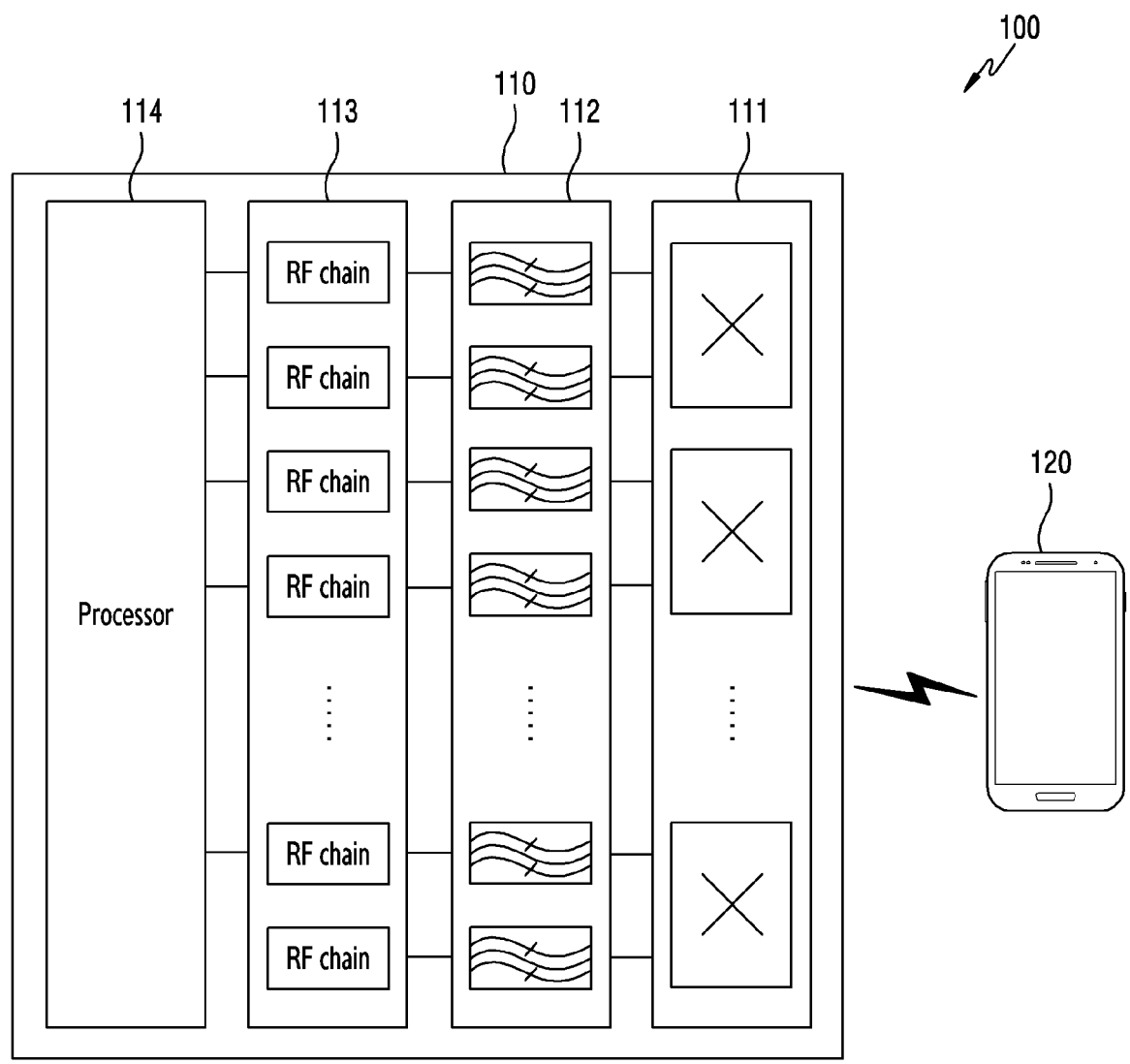
FIG. 1 illustrates an example of an electronic device according to various embodiments of the present disclosure.

FIG. 1 illustrates an example of an electronic device according to various embodiments of the present disclosure. A wireless communication environment 100 of FIG. 1, represents a base station 110 and a terminal 120, as some of nodes using a radio channel.

The base station 110 is a network infrastructure for providing the terminal 120 with radio access. The base station 110 has coverage defined as a specific geographical region based on a signal transmission distance. The base station 110 may be referred to as, besides the base station, an 'access point (AP)', an 'eNodeB (eNB)', a '5th generation (5G) node', a '5G NodeB', a 'next generation node B (gNB)', a 'wireless point', a 'transmission/reception point (TRP)', an 'access unit', a 'distributed unit (DU)', a 'transmission/reception point (TRP)', a 'radio unit (RU)', a remote radio head (RRH) or other term having the technically identical meaning. The base station 110 may transmit a downlink signal or a receive an uplink signal.

The terminal 120 is a device used by a user, and communicates with the base station 110 over the radio channel. In some cases, the terminal 120 may operate without user's involvement. That is, the terminal 120 is a device which performs machine type communication (MTC), and may not be carried by the user. The terminal 120 may be referred to as, besides the terminal, a 'user equipment (UE)', a 'mobile station', a 'subscriber station', a 'customer premises equipment (CPE)', a 'remote terminal', a 'wireless terminal', an 'electronic device', a 'vehicle terminal', a 'user device' or other term having technically equivalent meaning.

To improve communication performance, the number of antennas (or antenna elements) of equipment which performs wireless communication is increasing. Also, the number of radio frequency (RF) components for processing an RF signal transmitted or received through the antenna elements, and the number of components increase, and accordingly it is essential to satisfy the communication performance and to achieve spatial gain and cost efficiency in configuring the communication equipment. Hereafter, to describe a connection structure of the present disclosure and an electronic device including the same in FIG. 1, RF components of the base station 110 of FIG. 1 are described by way of example, but various embodiments of the present disclosure are not limited thereto. It is noted that the connection structure of the present disclosure and the electronic device including the same may be applied to the terminal 120 of FIG. 1, wireless equipment (e.g., a TRP) connected to a base station, or other equipment requiring a stable connection structure of communication components for signal processing.

Referring to FIG. 1, an exemplary functional configuration of the base station 110 is illustrated. The base station 110 may include an antenna unit 111, a filter unit 112, an RF processing unit 113, and a control unit 114.

The antenna unit 111 may include a plurality of antennas. The antennas perform functions for transmitting and receiving a signal over the radio channel. The antenna may include a conductor formed on a substrate (e.g., a printed circuit board (PCB)) or a radiator including a conductive pattern. The antenna may radiate an up-converted signal on the radio channel or obtain a signal radiated by another device. Each antenna may be referred to as an antenna element or an antenna device. In some embodiments, the antenna unit 111 may include an antenna array in which a plurality of antenna elements is arrayed. The antenna unit 111 may be electrically connected with the filter unit 112 through RF signal lines. The antenna unit 111 may be mounted on a PCB including the plurality of the antenna elements. The PCB may include the RF signal lines interconnecting each antenna element to a filter of the filter unit 112. The RF signal lines may be referred to as a feeding network. The antenna unit 111 may provide a received signal to the filter unit 112 or radiate a signal provided from the filter unit 112 into the air.

The filter unit 112 may perform filtering, to provide a signal of an intended frequency. The filter unit 112 may form resonance to perform a function for selectively identifying the frequency. In some embodiments, the filter unit 112 may form resonance through a cavity structurally including a dielectric. Also, in some embodiments, the filter unit 112 may form resonance through elements which form inductance or capacitance. The filter unit 112 may include at least one of a band pass filter, a low pass filter, a high pass filter, or a band reject filter. That is, the filter unit 112 may include RF circuits for acquiring a signal of a frequency band for transmission or a frequency band for reception. The filter unit 112 according to various embodiments may electrically interconnect the antenna unit 111 and the RF processing unit 113.

The RF processing unit 113 may include a plurality of RF paths. The RF path may be a unit of a path through which the signal received via the antenna or the signal radiated via the antenna passes. At least one RF path may be referred to as an RF chain. The RF chain may include a plurality of RF elements. The RF elements may include an amplifier, a mixer, an oscillator, a digital-to-analog converter (DAC), an analog-to-digital converter (ADC), and so on. For example, the RF processing unit 113 may include an up converter for up-converting a digital transmit signal of a baseband into the transmission frequency, and a DAC for converting the up-converted digital transmit signal into an analog RF transmit signal. The up converter and the DAC build a part of a transmission path. The transmission path may further include a power amplifier (PA) or a coupler (or a combiner). Also, for example, the RF processing unit 113 may include an ADC for converting an analog RF receive signal into a digital receive signal and a down converter for converting a digital receive signal into a digital receive signal of the baseband. The ADC and the down converter build a part of a reception path. The reception path may further include a low-noise amplifier (LNA) or a coupler (or a divider). The RF components of the RF processing unit may be implemented on a PCB. The base station 110 may include a structure in which the antenna unit 111—the filter unit 112—the RF processing unit 113 are stacked in order. The antennas and the RF components of the RF processing unit may be implemented on PCBs, and filters may be repeatedly fastened between the PCBs to form a plurality of layers.

The control unit 114 may control general operations of the base station 110. The control unit 114 may include various modules for performing the communication. The control unit 114 may include at least one processor. The control unit 114 may include modules for digital signal processing. For example, in data transmission, the control unit 114 generates complex symbols by encoding and modulating a transmit bit string. In addition, in data reception, the control unit 114 restores a received bit string by decoding and demodulating a baseband signal. The control unit 114 may perform functions of a protocol stack required in a communication standard.

Figure 2:
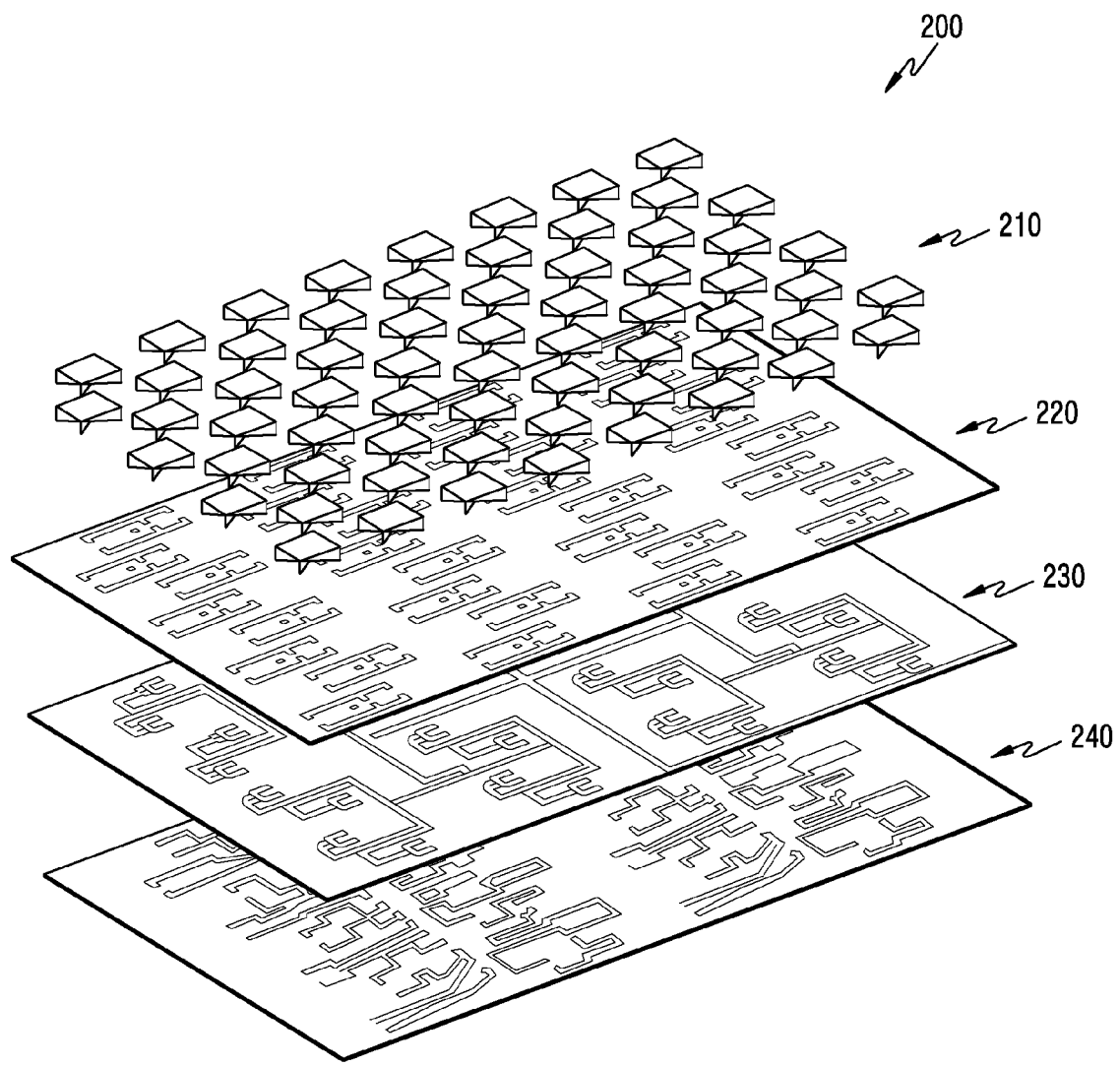
FIG. 2 illustrates an example of a configuration of an antenna module.

FIG. 2 illustrates an example of a configuration of an antenna module. An antenna module 200 represents a massive multiple-input multiple-output (MIMU) unit (MMU) antenna module.

Referring to FIG. 2, the antenna module 200 may have a structure in which an antenna array 210, a circuit board 220, a circuit board 230, and a circuit board 240 are stacked. According to various embodiments, the circuit boards 220, 230, and 240 each may be, but not limited to, a PCB.

Specifically, a feeding network for feeding power to a plurality of antenna elements may be implemented on the circuit board 220, and the antenna array 210 including the plurality of the antenna elements may be installed on the circuit board 220. The antenna array 210 and the feeding network implemented on the circuit board 220 may be electrically connected using a metal plate or the like.

In addition, a circuit building a calibration network may be implemented on the circuit board 230 disposed under the circuit board 220. The calibration network may be used to detect signal amplitude and phase changes per transmission path and to correct errors during operations of the antenna module.

Also, a circuit building a transmission layer may be implemented on the circuit board 240 disposed under the circuit board 230. The transmission layer may include power amplifiers, to thus transmit a signal with the amplified power to the feeding network.

Figure 3A:
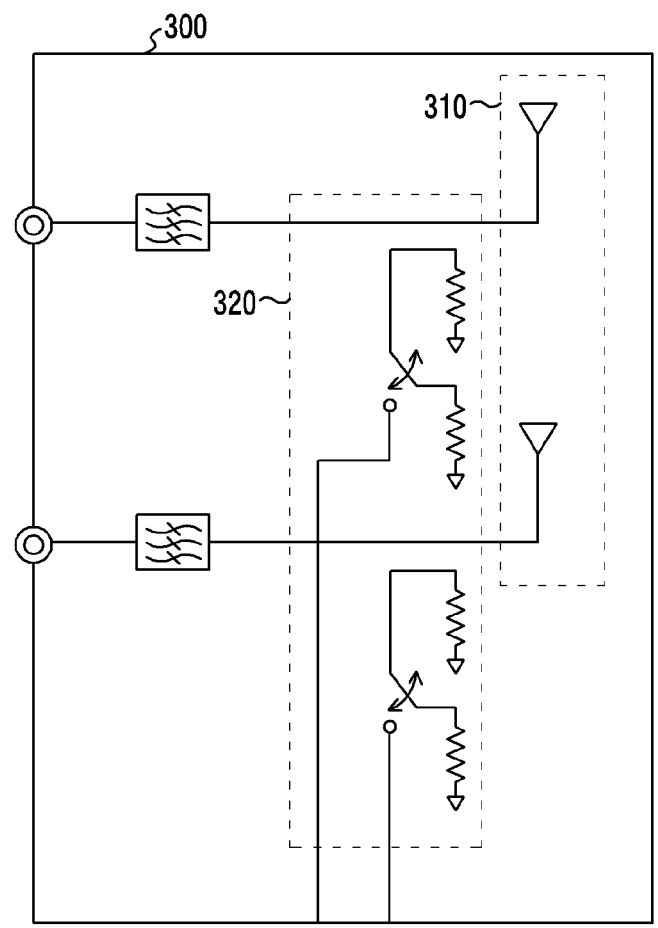
FIG. 3A illustrates an example of a block diagram representing configurations as circuits included in an antenna module.
Figure 3B:
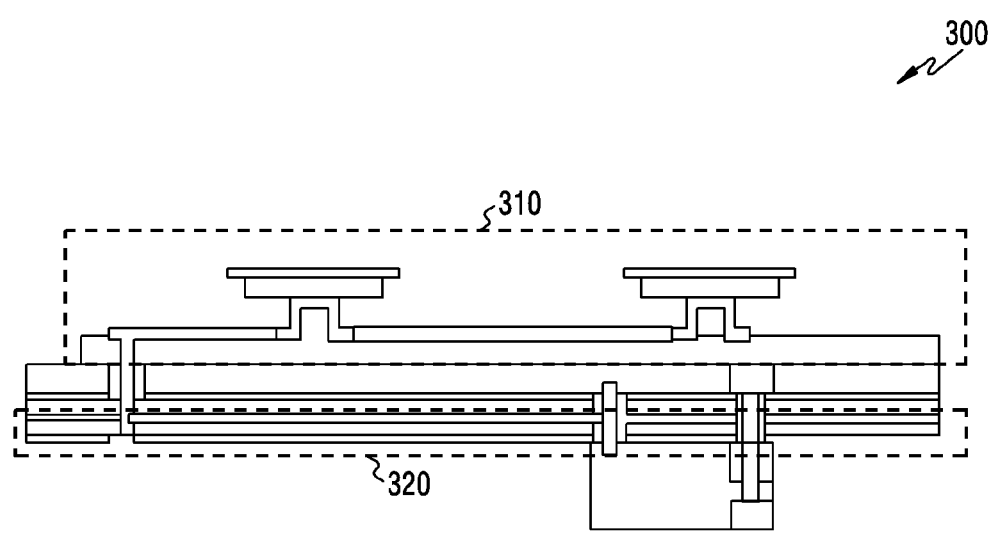
FIG. 3B illustrates an example of a cross section of a separate antenna module.
Figure 3C:
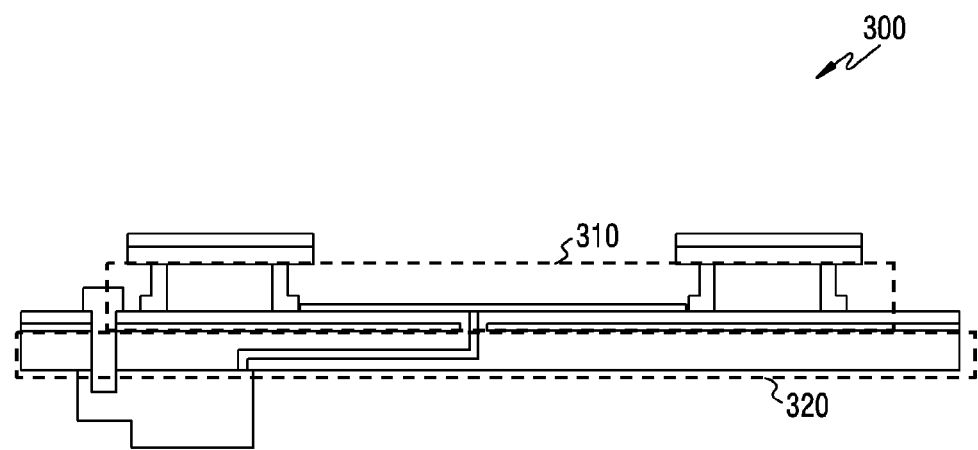
FIG. 3C illustrates an example of a cross section of an integrated antenna module.

FIG. 3A illustrates an example of a block diagram representing configurations included in an antenna module as circuits. FIG. 3B illustrates an example of a cross section of a separate antenna module. FIG. 3C illustrates an example of a cross section of an integrated antenna module. The antenna module represents the MMU antenna module. A block diagram 300 represents a part of the MMU antenna module.

Referring to FIG. 3A, the block diagram 300 may include filters, antenna elements 310, and part of a calibration network 320. A signal passing each filter may be radiated to outside by the antenna elements 310 through a coupler included in the calibration network 320. In this case, the coupler included in the calibration network 320 may extract a part of the signal transmitted to the antenna elements, such that the calibration network 320 may identify and correct amplitude and phase of the corresponding signal. The calibration network 320 may include the coupler for extracting the signal for each path, and control whether to turn on/off the calibration operation for each path through switching.

Referring to FIG. 3B, the block diagram 300 of the configurations of the MMU antenna module may be implemented as the separate MMU antenna module. Specifically, a metal plate may be interposed between the antenna board on which the antenna elements 310 shown in FIG. 3B are implemented and the calibration board on which the calibration network 320 is implemented. Hence, the antenna board and the calibration board may be implemented separately.

Referring to FIG. 3C, the block diagram 300 of the configurations of the MMU antenna module may be implemented as the integrated MMU antenna module. Specifically, the antenna board on which the antenna elements 310 shown in FIG. 3C are implemented may be positioned directly on the calibration board on which the calibration network 320 is implemented without a metal plate. Hence, the antenna board and the calibration board may be integrally implemented.

In the antenna module as described above, the coupler may be used as means for extracting the signal transmitted to the antenna element, for the calibration network to check the amplitude and the phase of the communication signal radiated by the antenna element. Various couplers may be used to extract the signal, but the present disclosure describes an antenna module which uses a coupled line coupler which is a directional coupler utilizing a coupled line. The coupled line coupler is a coupler implemented by arranging two lines to be adjacent and making facing portions between the lines ¼ of the signal wavelength, that is, $\lambda/4$ in length, and the extracted and/or detected signal amplitude may be adjusted by a spacing between the lines. The coupled line coupler may be implemented in a line form such as a microstrip line or a strip line. In addition, the coupled line coupler includes an input port, a through port, a coupled port, and an isolation port. If a signal is inputted to the input port, most of the power of the inputted signal may pass through the through port, and some of the power of the inputted signal may be outputted through the coupled port, thus extracting some of the power of the signal. In addition, since a termination resistor is added to match impedance of the line, the isolation port is used to prevent reflection of leakage power, not for input/output of signals. Hereafter, the present disclosure describes in detail a coupler structure for reducing the size of the above-described coupled line coupler.

Figure 4A:
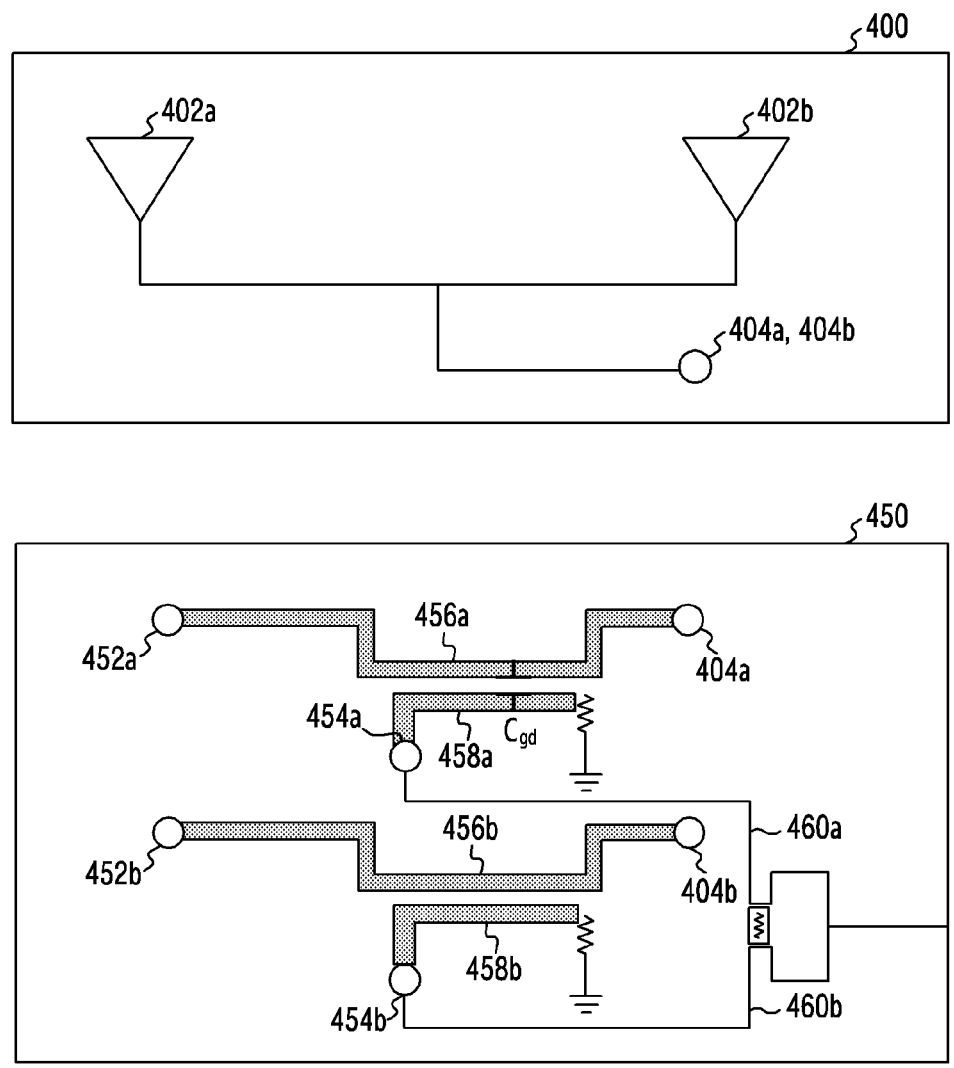
FIG. 4A illustrates an example of an antenna board structure and a calibration board structure included in an antenna module.
Figure 4B:
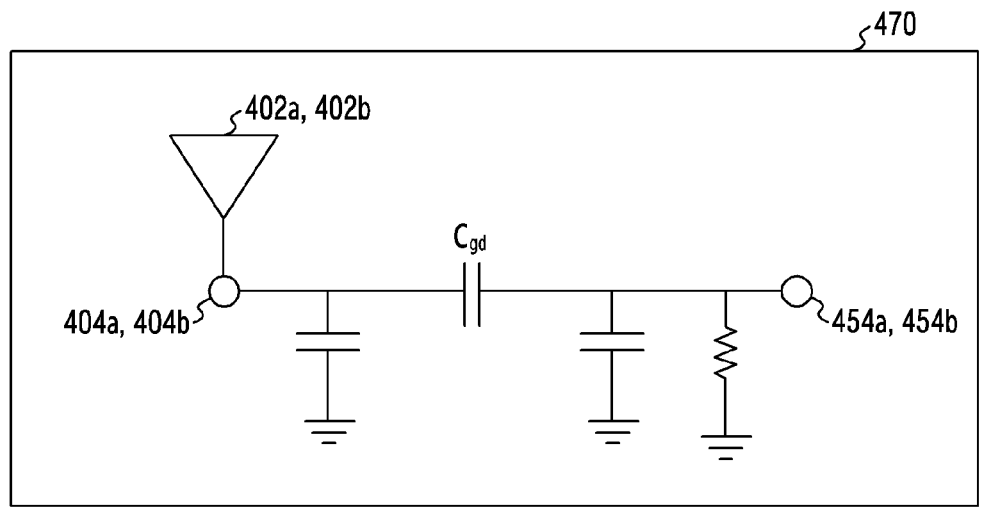
FIG. 4B illustrates an example of an equivalent circuit of the calibration board included in the antenna module.

FIG. 4A illustrates an example of an antenna board structure and a calibration board structure included in an antenna module. FIG. 4B illustrates an example of an equivalent circuit of the calibration board included in the antenna module. FIG. 4A is described with reference to the equivalent circuit 470 of FIG. 4B.

Referring to FIG. 4A, an antenna board 400 includes antenna elements 402a and 402b and antenna ports 404a and 404b. Herein, the antenna port indicates a port through which a feeding line for feeding power to the antenna elements passes. The feeding line may be disposed on the antenna board to pass through the antenna port and connect with the antenna elements. The antenna port shown on the antenna board may be one of the antenna port 404a or the antenna port 404b implemented on the calibration board, and the antenna elements 402a and 402b may be used to radiate a signal delivered through the feeding line which passes through one of the antenna port 404a or the antenna port 404b.

In this case, a coupler for extracting part of the signal transmitted to the antenna elements is implemented on the calibration board 450. Specifically, a line 456a interconnecting the antenna port 404a and a filter port 452a and a line 458a interconnecting a coupler port 454a and a termination resistor may be implemented on the calibration board 450. In addition, a line 456b interconnecting the antenna port 404b and a filter port 452b and a line 458b interconnecting a coupler port 454b and a termination resistor may be implemented on the calibration board 450. Herein, the line 456a and the line 456b each may be understood as a part of the feeding line for delivering signals to the antenna elements. Herein, the filter port indicates a port through which the line connected to the filter for filtering the signal delivered to the antenna element passes, as shown in FIG. 3A. In addition, the coupler port is a port through which a line connected to a calibration network circuit which corrects an error of the signal delivered to the antenna element passes, and may connect a coupler and a correction circuit to be described. The lines 456a, 458a, 456b, and 458b may be implemented in various forms such as a microstrip line and a strip line. Hence, a first directional coupler having capacitance Cgd may be formed by the line 456a and the line 458a, and a second directional coupler having capacitance Cgd may be formed by the line 456b and the line 458b. That is, with respect to the coupled line coupler, the filter ports 452a and 452b each may operate as the input port, the antenna ports 404a and 404b each may operate as the through port, and the coupler ports 454a and 454b each may operate as the coupled port. Accordingly, the line 456a and the line 456b for delivering the signal to the antenna element through the filter each may operate as a main path of the directional coupler, and the line 458a and the line 458b connected with the coupler port may operate as a sub path for extracting some signal component from the signal delivered to the antenna element.

It has been described that the capacitances between the lines have the same value for convenience of description, but the capacitances may be implemented differently. The above-described contents may be equally applied throughout the present disclosure.

If the antenna module structured as mentioned above is used, interference by a via may occur in the integrated MMU antenna module. For example, vias may be formed along the line forming the coupler on the calibration board and some of the antenna elements on the antenna board may overlap the calibration board circuit. These vias may affect the antenna board in the integrated antenna module. That is, signal interference may occur in the overlapping portion of the antenna board and the calibration board due to the vias connected to the antenna board.

Meanwhile, in the coupled line coupler, the portions which are adjacent and opposite to each other in the main path and the sub path must form ¼ of the wavelength, that is, $\lambda/4$ in length. However, if the coupler is implemented on the calibration board, a bypass path may be built for the main path of the coupler formed between the antenna port and the filter port. That is, due to restrictions in processing or designing, the line between the antenna port and the filter port operating as the main path is disposed to bypass and reach the antenna port, and accordingly insertion loss due to the bypass path may increase. For example, if the coupler is implemented on a low loss circuit board, the insertion loss may increase by 1 dB or more due to the bypass path.

Hereafter, the present disclosure describes coupler structures of two types for canceling interference due to vias formed in an antenna array and reducing insertion loss due to a bypass path. Hereafter, a first type coupler structure implemented on the antenna board is explained in detail, in FIG. 5 through FIG. 15B.

Figure 5:
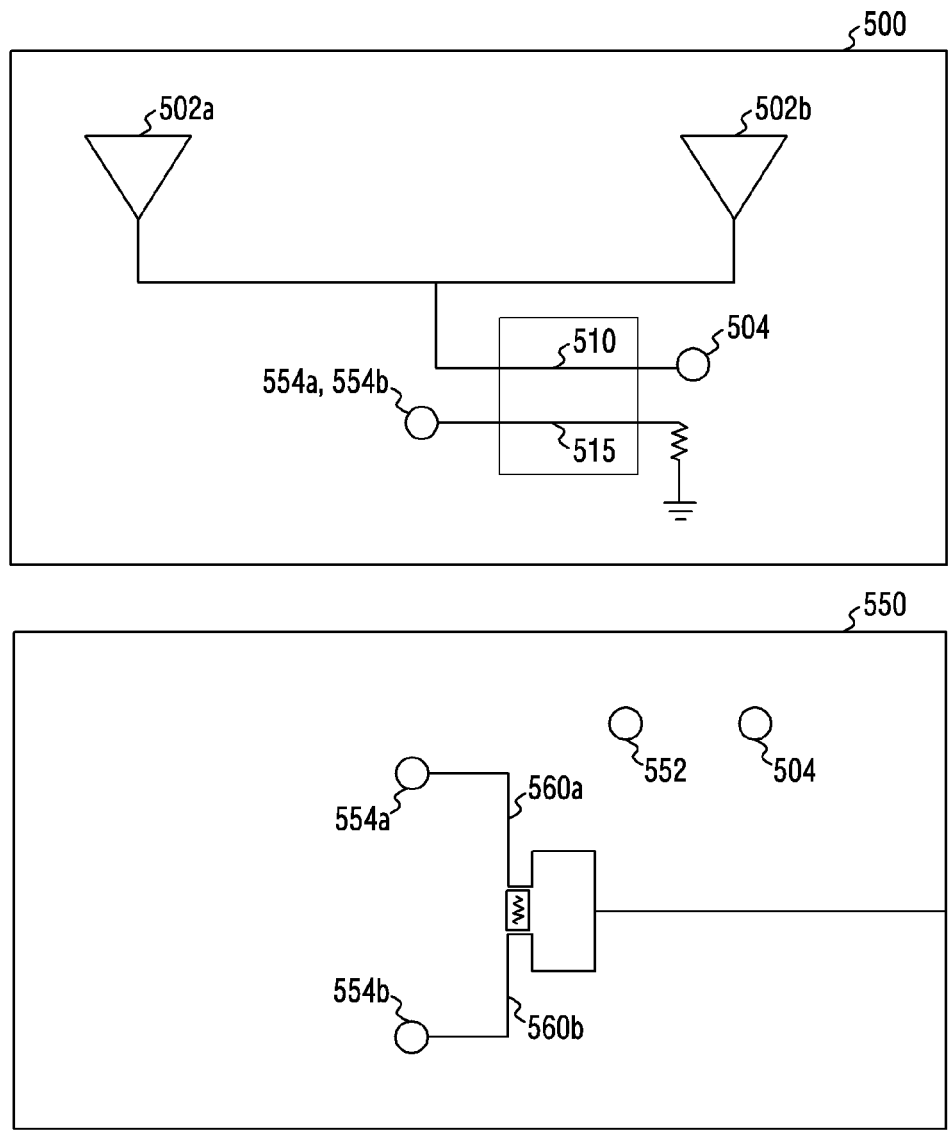
FIG. 5 illustrates a basic structure of a first type coupler in an antenna module according to various embodiments of the present disclosure.

FIG. 5 illustrates a basic structure of a first type coupler in an antenna module according to various embodiments of the present disclosure.

Referring to FIG. 5, an antenna board 500 includes antenna elements 502a and 502b, an antenna port 504, coupler ports 554a and 554b, a line 510 connected to the antenna port 504 and the antenna elements 502a and 502b, and a line 515 connected to the coupler ports 554a and 554b and a termination resistor. In addition, a calibration board 550 includes an antenna port 504, a filter port 552, coupler ports 554a and 554b, a line 560a connected to the coupler port 554a and a resistor, and a line 560b connected to the coupler port 554b and the resistor.

Specifically, the line 510 which is a part of the feeding line may be disposed to be connected with the antenna elements 502a and 502b on the antenna board 500, and the line 515 may be disposed on the antenna board 500 to be adjacent and parallel to the line 510. That is, the antenna port 504 may be the input port of the coupled line coupler, and the coupler ports 554a and 554b each may be the coupled port of the coupled line coupler. In addition, the line 510 may be configured as the main path of the coupled line coupler, and the line 515 may be configured as the sub path. In this case, since the coupler may be implemented directly on the antenna board regardless of the calibration network circuit, an additional bypass path is not required except that the length of the adjacent and opposite portions between the lines 510 and 515 should be $\lambda/4$. That is, since the bypass path of the feeding line which delivers a signal from the filter port of the calibration board toward the antenna port is not required, the length of the lines required to construct the coupler may be reduced.

In the first type coupler structure, the signal filtered at the filter passes through a line interconnecting the filter port 552 and the antenna port 504 and is delivered to the antenna elements 502a and 502b through the line 510 disposed on the antenna board 500 positioned on the calibration board 550. That is, the signal passing through the antenna port 504 which is the input port of the coupler may reach the antenna elements 502a and 502b by passing through the through port through the line 510 which is the main path. In addition, part of the signal inputted to the antenna port 504 may pass through the coupler ports 554a and 554b which are the coupled ports, and thus may be used for signal error correction due to the calibration network below.

The example in which the coupler is formed between the single line and the single line has been described as the basic structure of the first type coupler in FIG. 5, but it may be changed to various structures to be described.

Figure 6:
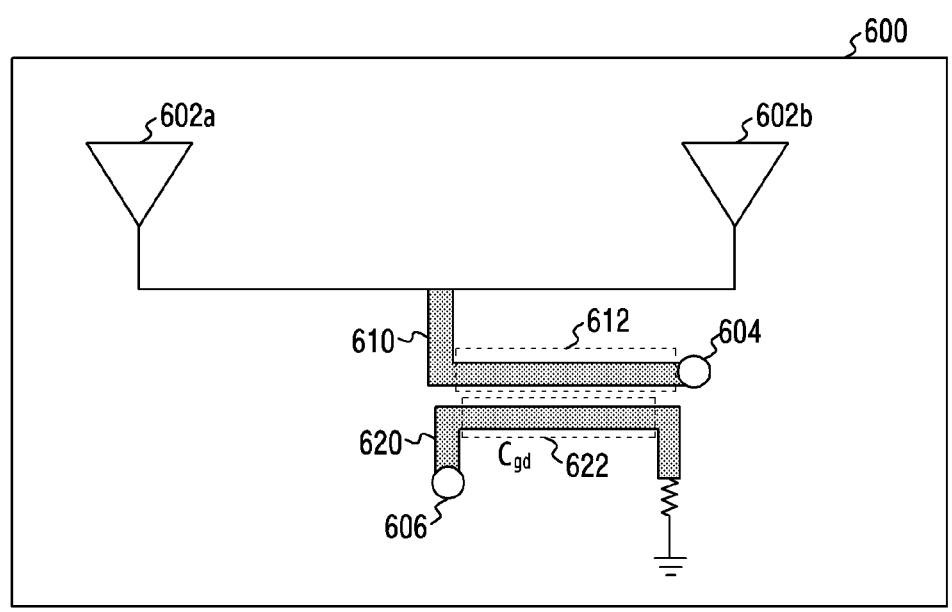
FIG. 6 illustrates a first structure of a first type coupler in an antenna module according to various embodiments of the present disclosure.

FIG. 6 illustrates a first structure of a first type coupler in an antenna module according to various embodiments of the present disclosure. FIG. 6 illustrates an example of a coupler structure formed on an antenna board.

Referring to FIG. 6, an antenna board 600 includes antenna elements 602a and 602b, an antenna port 604, a coupler port 606, a line 610 connected to the antenna port 604 and the antenna elements 602a and 602b, and a line 620 connected to the coupler port 606 and a termination resistor. In addition, a via may be formed at each of the antenna port 604 and the coupler port 606. That is, the antenna board 600 may include the antenna elements 602a and 602b and a coupler for extracting part of a signal transmitted to the plurality of the antenna elements 602a and 602b, and a calibration board may be disposed under the antenna board 600, and may include a correction circuit for correcting an error using the part of the signal extracted by the coupler.

The line 610 which is a part of the feeding line may be connected directly to the antenna elements 602a and 602b with one terminal end on the antenna board 600 or may be connected indirectly by contacting the line between the antenna elements 602a and 602b. The line 610 may be disposed to contact the antenna port 604 with the other terminal end, thus electrically connecting the calibration board below through the via formed in the antenna port 604. In addition, the line 610 may include a first portion 612 and the rest, a second portion. Specifically, the first portion 612 of the line 610 may be configured as a straight line contacting the antenna port 604. In addition, the second portion of the line 610 may include a bent line at the other terminal end point not connected with the antenna port 604 of the first portion. The terminal end not connected with the first portion 612 among both ends of the second portion may be connected directly or indirectly with the antenna elements 602a and 602b. That is, the first portion 612 and the second portion of the line 610 may be configured to form a specific angle based on a point which forms no straight line and is bent. FIG. 6 illustrates that the first portion 612 and the second portion form, but not limited to, the right angle, and the second portion may be disposed to form an angle for distinguishing from the first portion included as the component of the coupler. The first portion 612 of the line 610 implemented on the antenna board 600 may operate as the main path of the coupled line coupler as described above.

The line 620 may be disposed to capacitively connect with the line 610. Specifically, the line 620 may be connected to the termination resistor with one terminal end on the antenna board 600. The line 620 is disposed to contact the coupler port 606 with the other terminal end, and thus may be electrically connected with the calibration board below through the via formed at the coupler port 606. In addition, the line 620 may include at least a part 622 of the line 620 which is adjacent and parallel to the first portion 612 of the line 610. As described above, the at least the part 622 of the line 620 implemented on the antenna board 600 may operate as the sub path of the coupled line coupler. In this case, since the coupler may be implemented directly on the antenna board regardless of the calibration network circuit, no additional bypass path is required except that the length of the adjacent and facing portions 612 and 622 between the lines 610 and 620 should be λ/4. That is, since no bypass path of the feeding line for delivering the signal from the filter port of the calibration board toward the antenna port is required, the length of the lines required to form the coupler is reduced and the size of the couplers used in the antenna module may be reduced.

The coupled line coupler formed on the antenna board as described above may reduce the return loss of the signal transmitted to the antenna elements 602a and 602b, by adjusting the spacing between the first portion 612 of the line 610 which is the main path and the at least the part 622 of the line 620 which is the sub path. Hereafter, the reduction of the return loss using the coupled line coupler is described in FIG. 7A and FIG. 7B.

Figure 7A:
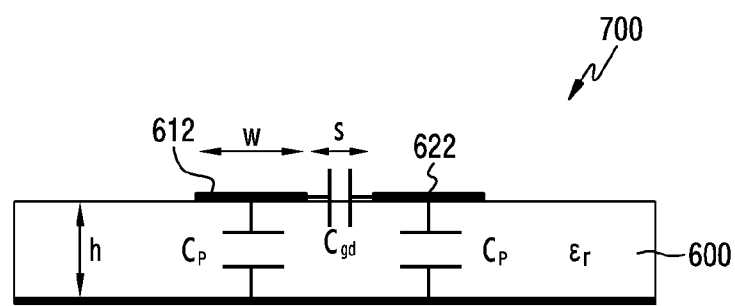
FIG. 7A illustrates an equivalent circuit from a side of a first structure of a first type coupler in an antenna module according to various embodiments of the present disclosure.
Figure 7B:
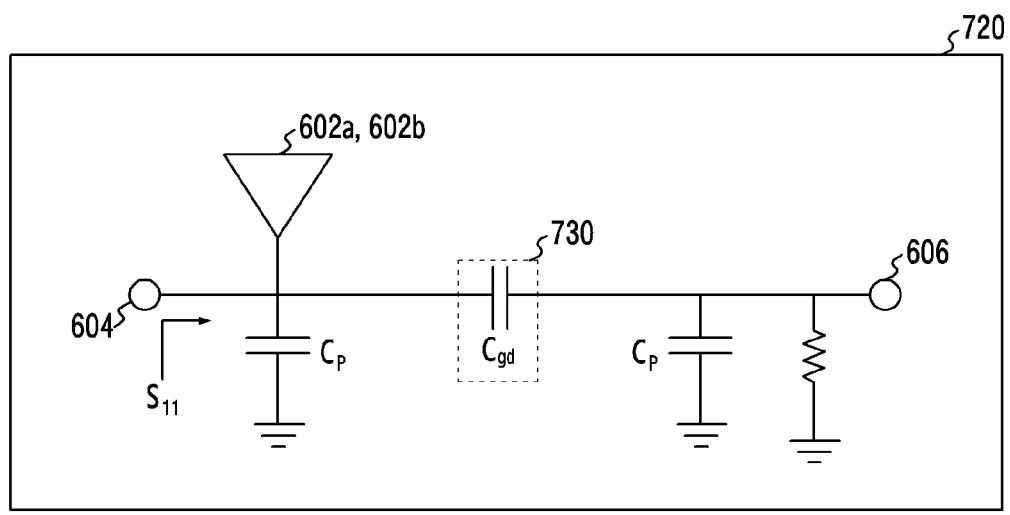
FIG. 7B illustrates the equivalent circuit for the first structure of the first type coupler in the antenna module according to various embodiments of the present disclosure.

FIG. 7A illustrates an equivalent circuit from a side of a first structure of a first type coupler in an antenna module according to various embodiments of the present disclosure. FIG. 7B illustrates an equivalent circuit for the first structure of the first type coupler in the antenna module according to various embodiments of the present disclosure. FIG. 7A and FIG. 7B illustrate the equivalent circuits for the coupled line coupler implemented on the antenna board 600 of FIG. 6.

Referring to FIG. 7A, a first capacitor may be formed each between the first portion 612 of the line 610 and the ground plane and between the at least the part 622 of the line 620 and the ground plane. In addition, a second capacitor may be formed between the first portion 612 of the line 610 and the at least the part 622 of the line 620. As shown in FIG. 7B, return loss S11 of the signal inputted from the antenna port 604 is determined based on capacitance CP of the first capacitor and capacitance Cgd of the second capacitor. Among the capacitors formed by the lines, the capacitance CP of the first capacitor may be expressed as the following <Equation 1>.

$$C_p = \varepsilon_0 \varepsilon_r \frac{w}{h} \qquad \langle \text{Equation 1} \rangle$$

Herein, $C_p$ denotes the capacitance formed between the line building the main path or the sub path of the coupler and the ground plane, $\varepsilon_0$ denotes permittivity of air, $\varepsilon_r$ denotes permittivity of a dielectric constructing the circuit board, h denotes a thickness of the dielectric constructing the circuit board, and w denotes a width of the line building the main path or the sub path of the coupler. Hence, $C_p$ is determined by factors which need to consider other components in designing the antenna module. In addition, the capacitance $C_{gd}$ of the second capacitor among the capacitors formed by the lines may be expressed as the following <Equation 2>.

$$C_{gd} = \frac{\varepsilon_0 \varepsilon_r r}{\pi} \ln\left\{\coth\left(\frac{\pi}{4}\frac{s}{h}\right)\right\} + 0.65 Cf\left(\frac{0.02}{s/h}\sqrt{\varepsilon_r}\right) + 1 - \varepsilon_r^{-2} \qquad \langle \text{Equation 2} \rangle$$

Herein, $C_{gd}$ denotes the capacitance formed between the line building the main path and the line building the sub path of the coupler, $\varepsilon_0$ denotes the permittivity of the air, $\varepsilon_r$ denotes the permittivity of the dielectric constructing the circuit board, h denotes the thickness of the dielectric constructing the circuit board, and s denotes the spacing between the line building the main path or the line building the sub path of the coupler. Accordingly, by controlling the capacitance by adjusting the spacing between the lines constructing the coupler on the antenna board, the coupler which reduces the return loss S11 may be implemented.

Figure 8A:
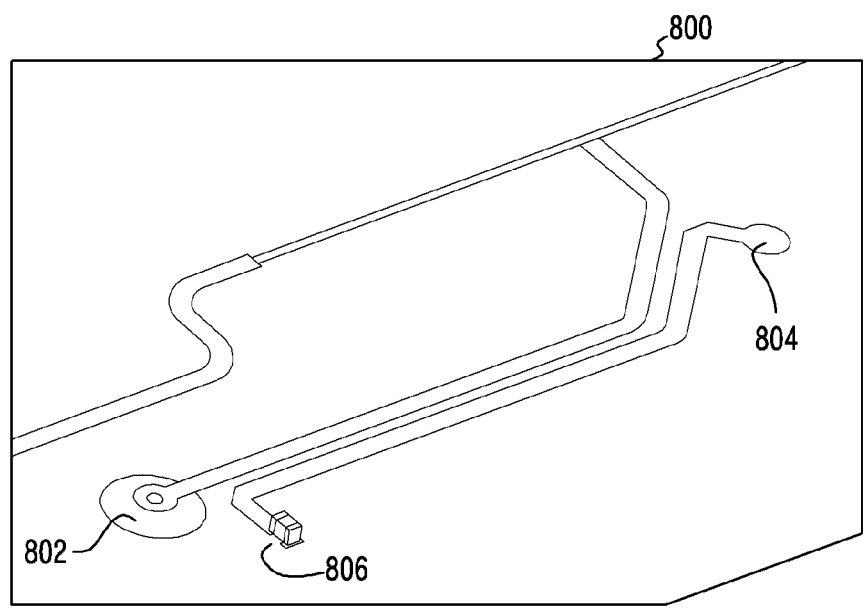
FIG. 8A illustrates a simulation environment for a first structure of a first type coupler in an antenna module according to various embodiments of the present disclosure.
Figure 8B:
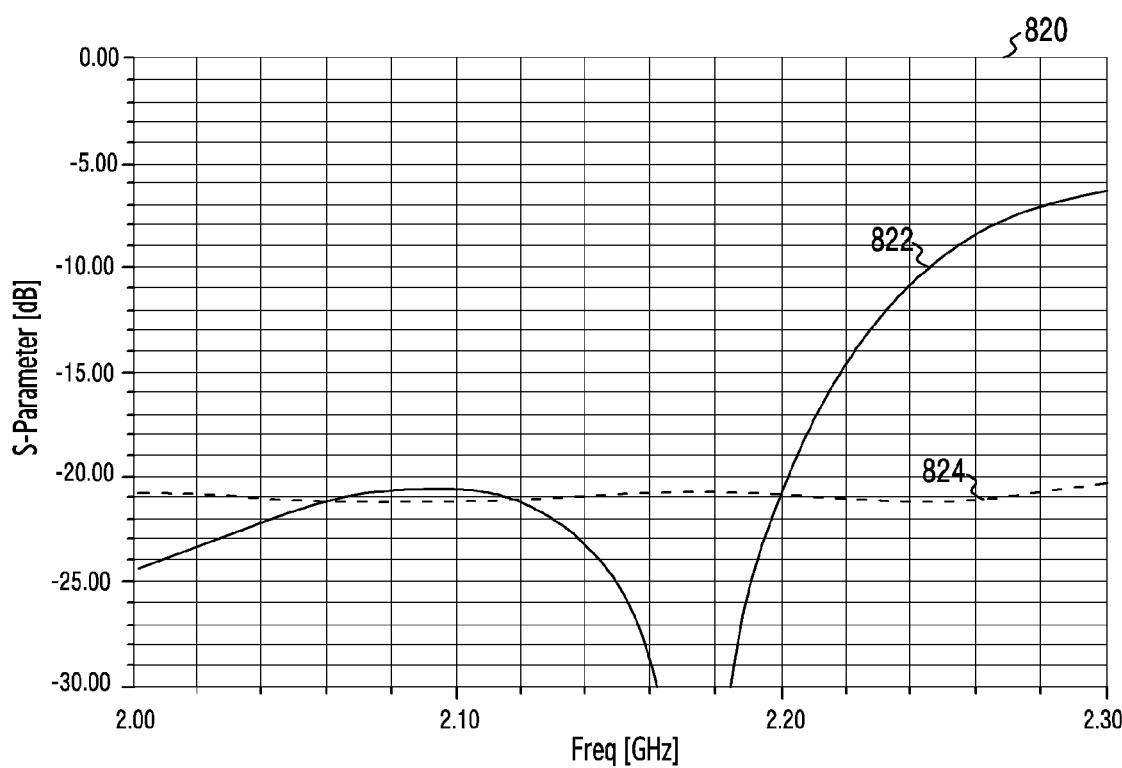
FIG. 8B illustrates simulation results for the first structure of the first type coupler in the antenna module according to various embodiments of the present disclosure.

FIG. 8A illustrates a simulation environment for a first structure of a first type coupler in an antenna module according to various embodiments of the present disclosure. FIG. 8B illustrates simulation results for the first structure of the first type coupler in the antenna module according to various embodiments of the present disclosure.

Referring to FIG. 8A, the coupler may be configured to include a main path for inputting a signal to an antenna port 802 and delivering it to antenna elements, and a sub path for connecting a coupler port 804 for extracting the signal and an isolation port 806. The isolation port 806 is connected to a termination resistor having a resistance value of 50 ohms. For the coupler shown in FIG. 8A, a curve 822 representing S parameter values for a signal component reflected back to the input port and a curve 824 representing S parameter values for a signal component extracted through the coupler port are shown in a signal frequency range from 2.00 GHz to 2.30 GHz in FIG. 8A. Referring to the curve 824, in the signal frequency range from 2.00 GHz to 2.30 GHz, the S parameter values for the signal component extracted through the coupler port are maintained at about −20.00 dB. That is, the coupler with the reduced size while maintaining the signal component extraction performance may be used.

Figure 9:
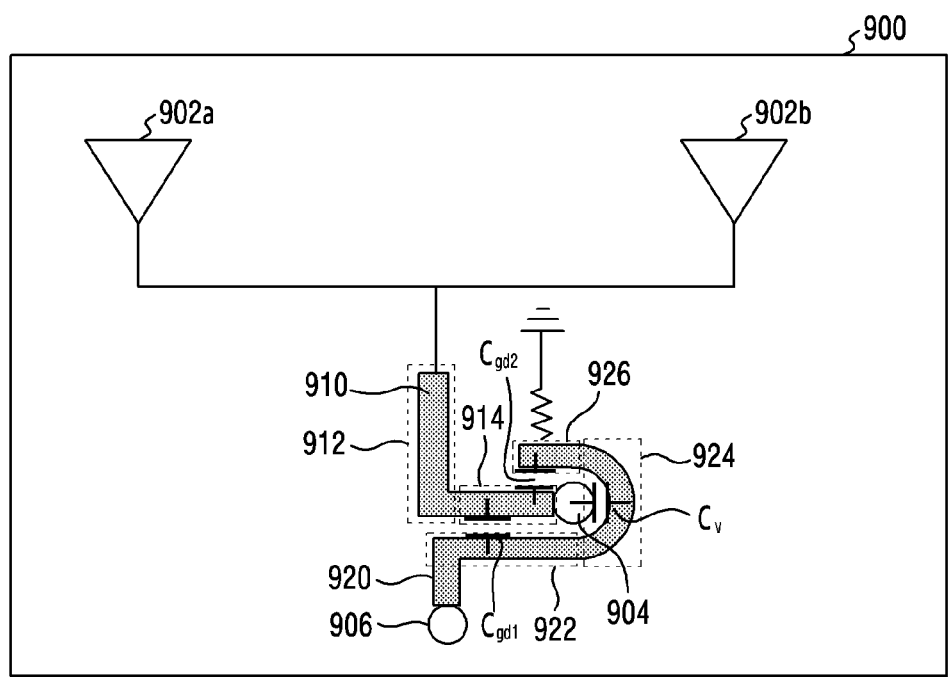
FIG. 9 illustrates a second structure of a first type coupler in an antenna module according to various embodiments of the present disclosure.

FIG. 9 illustrates a second structure of a first type coupler in an antenna module according to various embodiments of the present disclosure. FIG. 9 illustrates another example of the coupler structure formed on the antenna board.

Referring to FIG. 9, an antenna board 900 includes antenna elements 902a and 902b, an antenna port 904, a coupler port 906, a line 910 connected to the antenna port 904 and the antenna elements 902a and 902b, and a line 920 connected to the coupler port 906 and a termination resistor. In addition, a via may be formed in each of the antenna port 904 and the coupler port 906. That is, the antenna board 900 includes the antenna elements 902a and 902b and the coupler for extracting part of the signal transmitted to the plurality of the antenna elements 902a and 902b, and a calibration board may be disposed under the antenna board 900, and may include a correction circuit for correcting an error using the part of the signal extracted by the coupler.

The line 910 which is a part of the feeding line may be connected directly to the antenna elements 902a and 902b with one terminal end on the antenna board 900 or may be connected indirectly by contacting a line between the antenna elements 902a and 902b. The line 910 may be disposed to contact the antenna port 904 with the other terminal end, thus electrically connecting the calibration board below through the via formed in the antenna port 904. In addition, the line 910 may include a first portion 912 and a second portion 914. Specifically, the second portion 914 of the line 910 may be configured as a straight line which contacts the antenna port 904. In addition, the first portion 912 of the line 910 may include a bent line at the other terminal end point not connected with the antenna port 904 of the first portion 912. The terminal end not connected with the second portion 914 among both ends of the first portion 912 may be connected directly or indirectly with the antenna elements 902a and 902b. That is, the first portion 912 and the second portion 914 of the line 910 may be configured to form a specific angle based on the point which forms no straint line and is bent. FIG. 9 illustrates that the first portion 912 and the second portion 914 form, but not limited to, the right angle, and the first portion 912 may be disposed to form an angle for distinguishing from the second portion 914 included as the component of the coupler. As described above, the second portion 914 of the line 910 implemented on the antenna board 900 may operate as the main path of the coupled line coupler.

The line 920 may be disposed to capacitively connect with the line 910. Specifically, the line 920 may be disposed to connect with the termination resistor with one terminal end on the antenna board 900. The line 920 is disposed to contact the coupler port 906 with the other terminal end, and thus may be electrically connected with the calibration board below through the via formed in the coupler port 906. In addition, the line 920 may be formed to surround a via hole formed in the antenna port 904. Specifically, the line 920 may include a first portion 922 and a third portion 926 including a line disposed adjacent to and parallel with the second portion 914 of the line 910, and a second portion 924 including a line disposed in a curved shape to surround the antenna port 904. The first portion 922 of the line 920 may include a line disposed adjacent and parallel to a first side of the line constructing the second portion 914 of the line 910. The third portion 926 of the line 920 may include a line adjacent and parallel to a second side of the line constructing the second portion 914 of the line 910. Herein, the side of the line constructing the second portion 914 of the line 910 may indicate a surface parallel to a direction in which the line travels from the antenna port 904. The second portion 924 of the line 920 is a portion of the line connected with the first portion 922 and the third portion 926 with the respective terminal ends, and may be formed to surround the antenna port 904 on the other side of the second portion 914 of the line 910 based on the antenna port 904. That is, the first portion 922 of the line 920 and the third portion 926 of the line 920 may be spaced apart to be parallel with the line 910 based on the line 910, and the second portion 924 of the line 920 may be disposed to connect to the first portion 922 of the line 920 and the third portion 926 of the line 920 with the respective terminal ends and to surround a via hole penetrating the antenna board in a vertical direction. As mentioned above, the first portion 922, the second portion 924, and the third portion 926 of the line 920 implemented on the antenna board 900 may operate as the sub path of the coupled line coupler.

In this case, since the coupler may be implemented directly on the antenna board regardless of the calibration network circuit, no additional bypass path is required except that each length of sums of the portion 914 constructing the coupled line coupler in the line 910 and the portions 922, 924, and 926 constructing the coupled line coupler in the line 920 should be about λ/4. In addition, the second structure of the first type coupler shown in FIG. 9 has the form in which the line operating as the sub path may form a double capacitor on both sides of the line operating as the main path, and thus the size of the coupler may be further reduced by increasing the capacitance per unit length. The coupled line coupler formed on the antenna board as described above may adjust the spacing between the second portion 914 of the line 910 which is the main path and the portions 922, 924, and 926 of the line 920 which is the sub path, thus reducing the return loss of the signal delivered to the antenna elements 902a and 902b. Hereafter, the return loss reduction using the coupled line coupler is described in FIG. 10A and FIG. 10B.

Figure 10A:
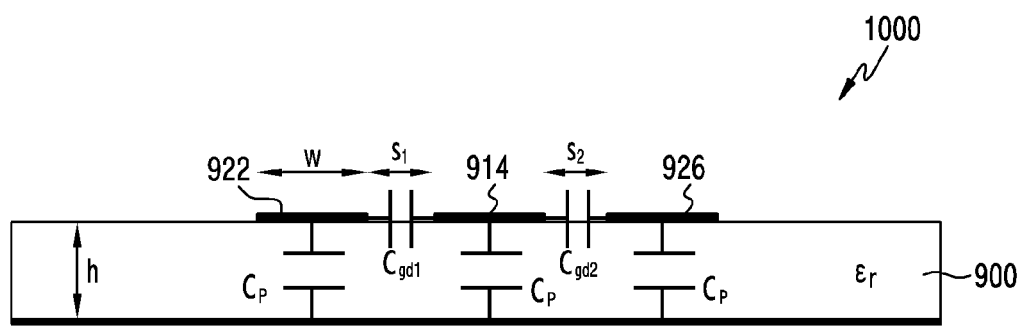
FIG. 10A illustrates an equivalent circuit from a side of a second structure of a first type coupler in an antenna module according to various embodiments of the present disclosure.
Figure 10B:
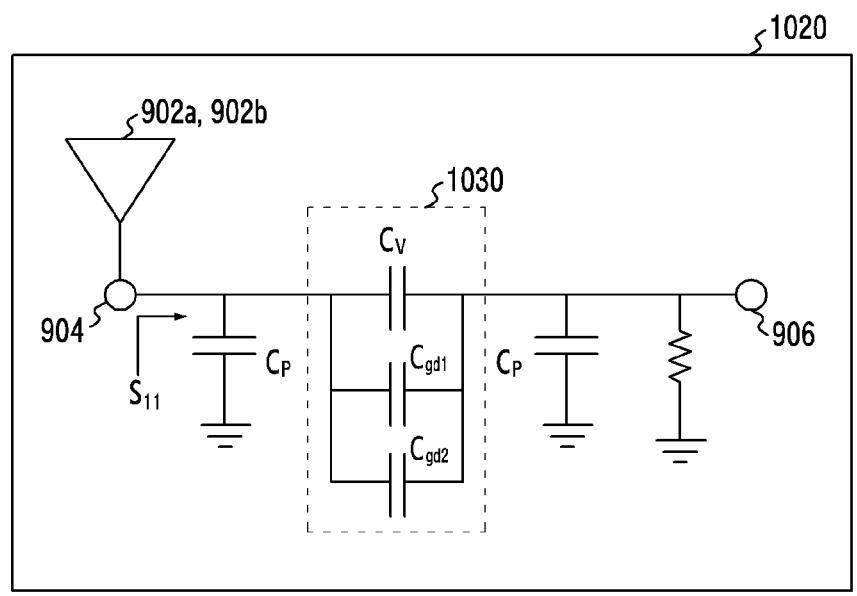
FIG. 10B illustrates the equivalent circuit for the second structure of the first type coupler in the antenna module according to various embodiments of the present disclosure.

FIG. 10A illustrates an equivalent circuit from a side of a second structure of a first type coupler in an antenna module according to various embodiments of the present disclosure. FIG. 10B illustrates an equivalent circuit for the second structure of the first type coupler in the antenna module according to various embodiments of the present disclosure. FIG. 10A and FIG. 10B illustrate the equivalent circuits of the coupled line coupler implemented in the antenna board 900 of FIG. 9.

Referring to FIG. 10A, a first capacitor may be formed each between the second portion 914 of the line 910 and the ground plane, between the first portion 922 of the line 920 and the ground plane, and between the third portion 926 of the line 920 and the ground plane. Also, a second capacitor may be formed between the second portion 914 of the line 910 and the first portion 922 of the line 920, and a third capacitor may be formed between the second portion 914 of the line 910 and the third portions 926 of the line 920. In addition, although not depicted in FIG. 10A, a fourth capacitor may be formed between the antenna port 904 and the second portion 924 of the line 920. As shown in FIG. 10B, the return loss S11 of the signal inputted from the antenna port 904 is determined based on the capacitance CP of the first capacitor, the capacitance Cgd1 of the second capacitor, the capacitance Cgd2 of the third capacitor, and the capacitance CV of the fourth capacitor. Herein, since the second capacitor, the third capacitor, and the fourth capacitor are connected in parallel, they may be interpreted as one equivalent capacitor 1030. Hence, capacitance CT of the equivalent capacitor 1030 may have a value of CT=Cgd1+Cgd2+CV. The capacitance CP of the first capacitor among the capacitors formed by the lines may be expressed as <Equation 1>. In addition, the capacitance Cgd1 of the second capacitor and the capacitance Cgd2 of the third capacitor among the capacitors formed by the lines each may be expressed as <Equation 2>. Herein, since a spacing s1 between the second portion 914 of the line 910 and the first portion 922 of the line 920 and a spacing S2 between the second portion 914 of the line 910 and the third portion 926 of the line 920 may be designed differently, Cgd1 and Cgd2 may have different values. Thus, the coupler for reducing the return loss S11 may be implemented, by controlling the capacitance by adjusting the spacings between the lines constructing the coupler on the antenna board.

Figure 11A:
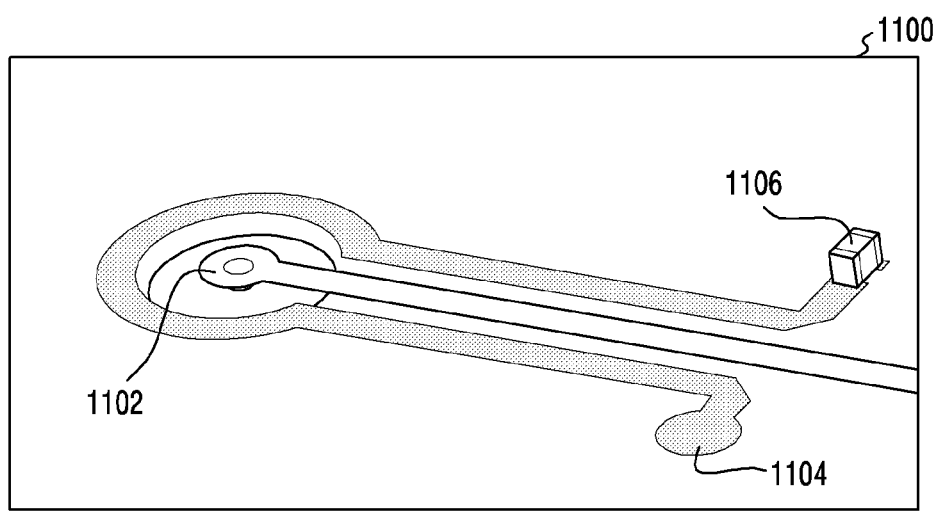
FIG. 11A illustrates a simulation environment for a second structure of a first type coupler in an antenna module according to various embodiments of the present disclosure.
Figure 11B:
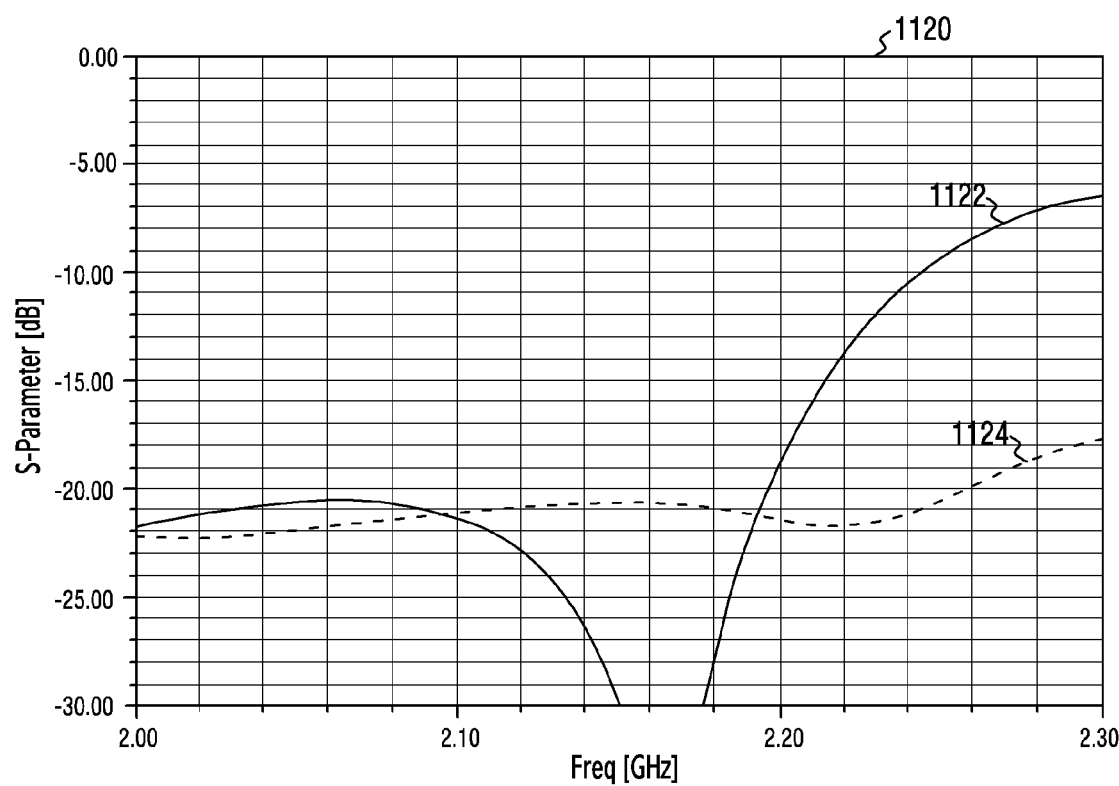
FIG. 11B illustrates simulation results for the second structure of the first type coupler in the antenna module according to various embodiments of the present disclosure.

FIG. 11A illustrates a simulation environment for a second structure of a first type coupler in an antenna module according to various embodiments of the present disclosure. FIG. 11B illustrates simulation results of the second structure of the first type coupler in the antenna module according to various embodiments of the present disclosure.

Referring to FIG. 11A, the coupler may be implemented to include a main path for inputting a signal to an antenna port 1102 and delivering it to antenna elements, and a sub path for interconnecting a coupler port 1104 for extracting the signal and an isolation port 1106. The isolation port 1106 is connected to a termination resistor having the resistance value of 50 ohms. With respect to the coupler shown in FIG. 11A, a curve 1122 representing S parameter values for a signal component reflected back to the input port and a curve 1124 representing S parameter values for a signal component extracted through the coupler port are shown in a signal frequency range from 2.00 GHz to 2.30 GHz in FIG. 11B. Referring to the curve 1124, in the signal frequency range from 2.00 GHz to 2.30 GHz, the S parameter values for the signal component extracted through the coupler port are maintained within the range of −18.00 dB to −22.00 dB. That is, the coupler with the reduced size while maintaining the signal component extraction performance may be used.

Figure 12:
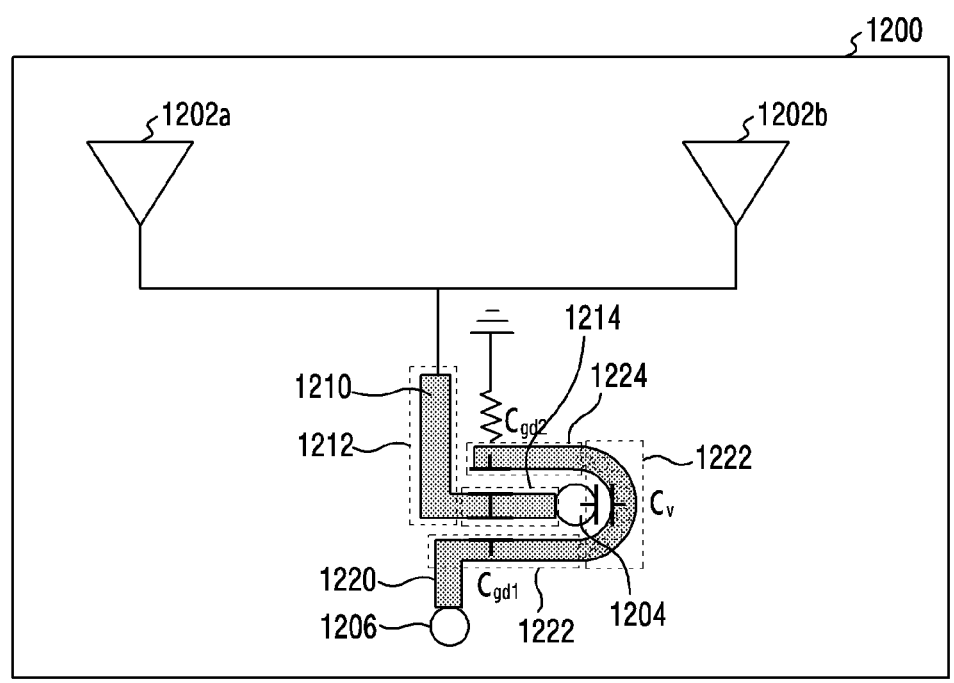
FIG. 12 illustrates a third structure of a first type coupler in an antenna module according to various embodiments of the present disclosure.

FIG. 12 illustrates a third structure of a first type coupler in an antenna module according to various embodiments of the present disclosure. FIG. 12 shows yet another example of the coupler structure formed on the antenna board.

Referring to FIG. 12, an antenna board 1200 includes antenna elements 1202a and 1202b, an antenna port 1204, a coupler port 1206, a line 1210 connected to the antenna port 1204 and the antenna elements 1202a and 1202b, and a line 1220 connected to the coupler port 1206 and a termination resistor. In addition, a via may be formed in each of the antenna port 1204 and the coupler port 1206. That is, the antenna board 1200 includes the antenna elements 1202a and 1202b and a coupler for extracting part of a signal transmitted to the plurality of the antenna elements 1202a and 1202b, and a calibration board may be disposed under the antenna board 1200, and include a correction circuit for correcting an error using the part of the signal extracted by the coupler.

The line 1210 which is a part of the feeding line may be connected directly to the antenna elements 1202a and 1202b with one terminal end on the antenna board 1200 or may be connected indirectly by contacting a line between the antenna elements 1202a and 1202b. The line 1210 may be disposed to contact the antenna port 1204 with the other terminal end, thus electrically connecting the calibration board below through the via formed in the antenna port 1204. In addition, the line 1210 may include a first portion 1212 and a second portion 1214. Specifically, the second portion 1214 of the line 1210 may be configured as a straight line contacting the antenna port 1204. In addition, the first portion 1212 of the line 1210 may include a bent line at the other terminal end point not connected to the antenna port 1204 of the first portion 1212. The terminal end not connected with the second portion 1214 among both ends of the first portion 1212 may be directly or indirectly connected with the antenna elements 1202a and 1202b. That is, the first portion 1212 and the second portion 1214 of the line 1210 may be configured to form a specific angle based on the point which forms no straight line but is bent. FIG. 12 illustrates that the first portion 1212 and the second portion 1214 form, but not limited to, the right angle, and the first portion 1212 may be disposed to form an angle for distinguishing from the second portion 1214 included as the component of the coupler. As described above, the second portion 1214 of the line 1210 implemented on the antenna board 1200 may operate as the main path of the coupled line coupler.

The line 1220 may be disposed to capacitively connect with the line 1210. Specifically, the line 1220 may be disposed to connect with the termination resistor on the antenna board 1200 with one terminal end. The line 1220 may be disposed to contact the coupler port 1206 with the other terminal end, and thus may be electrically connected with the calibration board below through the via formed in the coupler port 1206. In addition, the line 1220 may be formed to surround a via hole formed in the antenna port 1204. Specifically, the line 1220 may include a first portion 1222 and a third portion 1226 including a line disposed adjacent and parallel to the second portion 1214 of the line 1210, and a second portion 1224 including vias disposed in a curved shape to surround the antenna port 1204. The first portion 1222 of the line 1220 may include a line disposed adjacent and parallel to a first side of the line constructing the second portion 1214 of the line 1210. The third portion 1226 of the line 1220 may include a line adjacent and parallel to a second side of the line constructing the second portion 1214 of the line 1210. Herein, the side of the line constructing the second portion 1214 of the line 1210 may indicate a surface parallel to a direction in which the line travels from the antenna port 1204. The second portion 1224 of the line 1220 is an array of the vias connected with the first portion 1222 and the third portion 1226 with the respective terminal ends, and may be formed to surround the antenna port 1204 on the other side of the second portion 1214 of the line 1210 based on the antenna port 1204. In this case, the plurality of the vias may be formed on the antenna board 1200 with a narrow spacing between them to have a similar form to the line constructing the second portion 924 shown in FIG. 9. That is, the first portion 1222 of the line 1220 and the third portion 1226 of the line 1220 may be disposed apart to be parallel to the line 1210 based on the line 1210, and the second portion 1224 of the line 1220 may be disposed to connect with the first portion 1222 of the line 1220 and the third portion 1226 of the line 1220 with the respective terminal ends and to surround the via hole penetrating the antenna board in the vertical direction. The first portion 1222, the second portion 1224, and the third portion 1226 of the line 1220 implemented on the antenna board 1200 may operate as the sub path of the coupled line coupler as aforementioned.

In this case, since the coupler may be implemented directly on the antenna board regardless of the calibration network circuit, no additional bypass path is required except that each length of sums of the portion 1214 constructing the coupled line coupler in the line 1210 and the portions 1222, 1224, and 1226 constructing the coupled line coupler in the line 1220 should be about λ/4. In addition, the line operating as the sub path forms a double capacitor on both sides of the line operating as the main path and the second portion 1222 is formed with the vias, and thus the third structure of the first type coupler shown in FIG. 12 may further increase capacitance per unit length. Hence, the size of the coupler may be further reduced. The coupled line coupler formed on the antenna board as described above may adjust the spacings between the second portion 1214 of the line 1210 which is the main path and the portions 1222, 1224, and 1226 of the line 1220 which is the sub path, thus reducing the return loss of the signal delivered to the antenna elements 1202a and 1202b.

Figure 13A:
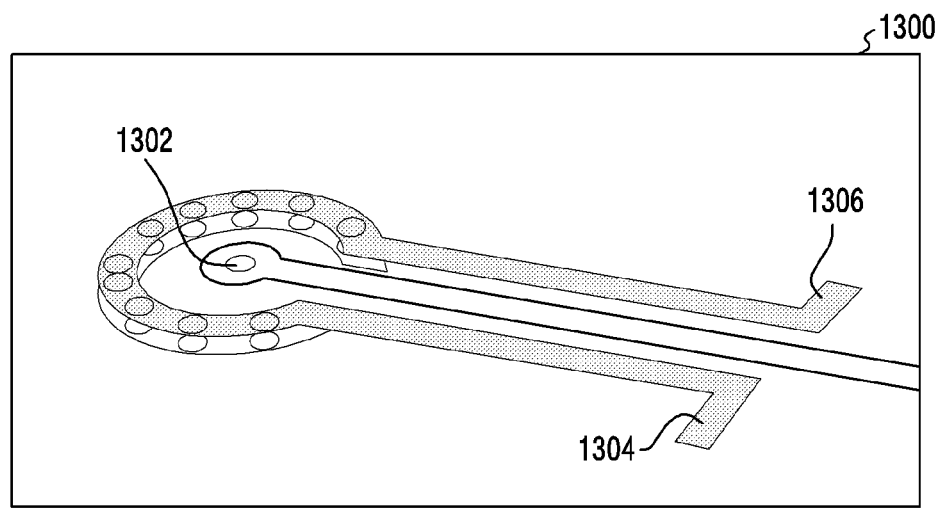
FIG. 13A illustrates a simulation environment for a third structure of a first type coupler in an antenna module according to various embodiments of the present disclosure.
Figure 13B:
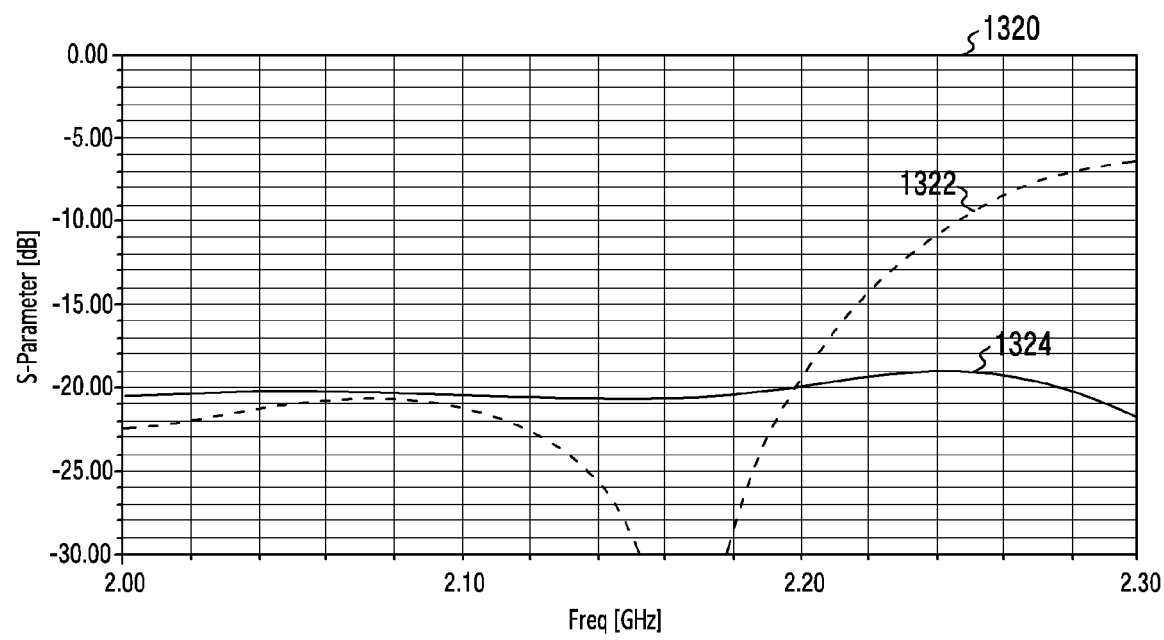
FIG. 13B illustrates simulation results for the third structure of the first type coupler in the antenna module according to various embodiments of the present disclosure.

FIG. 13A illustrates a simulation environment for a third structure of a first type coupler in an antenna module according to various embodiments of the present disclosure. FIG. 13B illustrates simulation results of the third structure of the first type coupler in the antenna module according to various embodiments of the present disclosure.

Referring to FIG. 13A, the coupler may be implemented to include a main path for inputting a signal to an antenna port 1302 and delivering it to antenna elements, and a sub path for interconnecting a coupler port 1304 for extracting the signal and an isolation port 1306. The isolation port 1306 is connected to a termination resistor having the resistance value of 50 ohms. With respect to the coupler shown in FIG. 13A, a curve 1322 representing S parameter values for a signal component reflected back to the input port and a curve 1324 representing S parameter values for a signal component extracted through the coupler port are shown in a signal frequency range from 2.00 GHz to 2.30 GHz in FIG. 13B. Referring to the curve 1324, in the signal frequency range from 2.00 GHz to 2.30 GHz, the S parameter values for the signal component extracted through the coupler port are maintained within the range of −19.00 dB to −22.00 dB. That is, the coupler with the reduced size while maintaining the signal component extraction performance may be used.

Figure 14A:
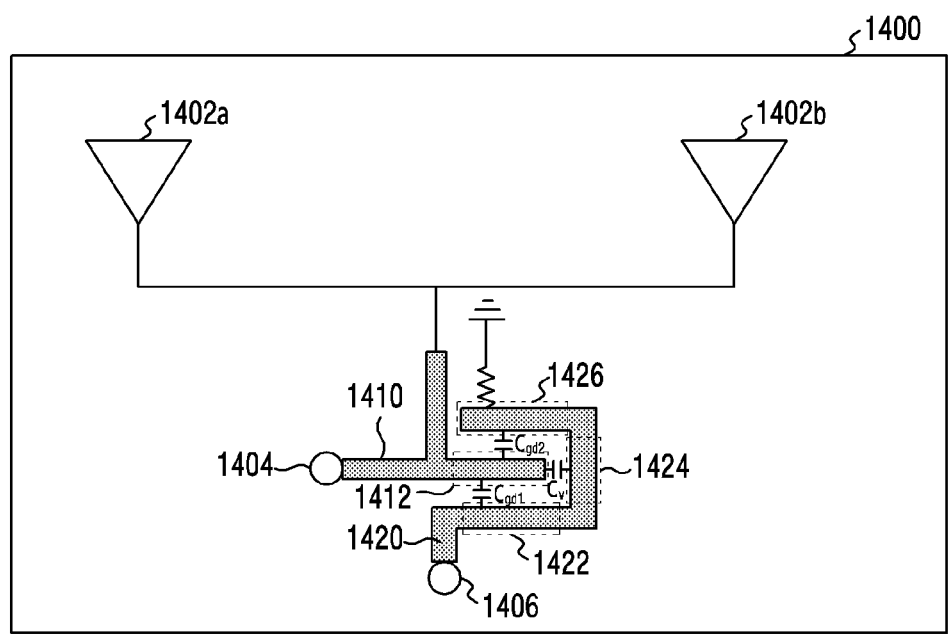
FIG. 14A illustrates a fourth structure of a first type coupler in an antenna module according to various embodiments of the present disclosure.

FIG. 14A illustrates a fourth structure of a first type coupler in an antenna module according to various embodiments of the present disclosure. FIG. 14A illustrates still another example of the coupler structure formed on the antenna board.

Referring to FIG. 14A, an antenna board 1400 includes antenna elements 1402a and 1402b, an antenna port 1404, a coupler port 1406, a line 1410 connected to the antenna port 1404 and the antenna elements 1402a and 1402b, and a line 1420 connected to the coupler port 1406 and a termination resistor. In addition, a via may be formed in each of the antenna port 1404 and the coupler port 1406. That is, the antenna board 1400 includes the antenna elements 1402a and 1402b and a coupler for extracting part of a signal transmitted to the plurality of the antenna elements 1402a and 1402b, and a calibration board may be disposed under the antenna board 1400, and include a correction circuit for correcting an error using the part of the signal extracted by the coupler.

The line 1410 which is a part of the feeding line may be connected directly to the antenna elements 1402a and 1402b with a first terminal end on the antenna board 1400 or may be connected indirectly by contacting a line between the antenna elements 1402a and 1402b. Also, the line 1410 may be disposed to contact the antenna port 1404 with a second terminal end, thus electrically connecting the calibration board below through the via formed in the antenna port 1404. In addition, the line 1410 may include a first portion operating as the main path of the coupler and a second portion 1412 serving as an antenna matching stub. Specifically, the first portion of the line 1410 may include a line portion disposed to proceed from the antenna port 1404 directly to the antenna elements 1402a and 1402b. That is, the first portion of the line 1410 indicates the line portion directly interconnecting the above-described first and second terminal ends without bypassing them. In addition, the second portion 1412 of the line 1410 may be disposed to be surrounded by the line 1420, by protruding to be distinguished from the first portion of the line 1410. As mentioned above, the first portion of the line 1410 implemented on the antenna board 1400 is the main path of the coupled line coupler though which a signal destined for the antenna elements pass, and the second portion 1412 may be an element added as the antenna matching stub.

The line 1420 may be disposed to capacitively connect with the line 1410. Specifically, the line 1420 may be disposed to connect with the termination resistor on the antenna board 1400 with one terminal end. The line 1420 may be disposed to contact the coupler port 1406 with the other terminal end, and thus may be electrically connected with the calibration board below through the via formed in the coupler port 1406. In addition, the line 1420 may be formed to surround the antenna matching stub 1412. Specifically, the line 1420 may include a first portion 1422 and a third portion 1426 including a line disposed adjacent and parallel to the antenna matching stub 1412 of the line 1410, and a second portion 1424 including a line disposed to surround the antenna matching stub 1412 with the line 1420 by interconnecting the first portion 1422 and the third portion 1426. The first portion 1422 of the line 1420 may include a line disposed adjacent to and parallel to a first side of the line constructing the antenna matching stub 1412 of the line 1410. The third portion 1426 of the line 1420 may include a line adjacent to and parallel to a second side of the line constructing the antenna matching stub 1412 of the line 1410. Herein, the side of the line constructing the antenna matching stub 1412 of the line 1410 may indicate a surface parallel to a direction in which the line travels from the antenna port 1404 to the antenna matching stub 1412. The second portion 1424 of the line 1420 is a line connected with the first portion 1422 and the third portion 1426 with the respective terminal ends, and may be formed to surround the antenna matching stub 1412 on the other side of the antenna port 1404 based on the antenna matching stub 1412. The first portion 1422 and the second portion 1424, and the third portion 1426 and the second portion 1424 form, but not limited to, the right angle in FIG. 14A. The first portion 1422 and the second portion 1424, and the third portion 1426 and the second portion 1424 may be disposed to form an arbitrary angle, or the second portion 1424 may be formed to be curved. The first portion 1422, the second portion 1424, and the third portion 1426 of the line 1420 implemented on the antenna board 1400 may operate as the sub path of the coupled line coupler as mentioned above.

Since the line operating as the sub path interacts with both sides of the antenna matching stub, the fourth structure of the first type coupler shown in FIG. 14A forms a double capacitor, and the size of the coupler may be further reduced by increasing capacitance per unit length. In addition, by utilizing an inductor formed by the antenna matching stub for impedance matching, the return loss of the signal delivered to the antenna elements 1402a and 1402b may be further reduced. Further, by adjusting the spacings between the antenna matching stub 1412 and the portions 1422, 1424, and 1426 of the line 1420 which is the sub path, the return loss of the signal delivered to the antenna elements 1402a and 1402b may be reduced.

Figure 14B:
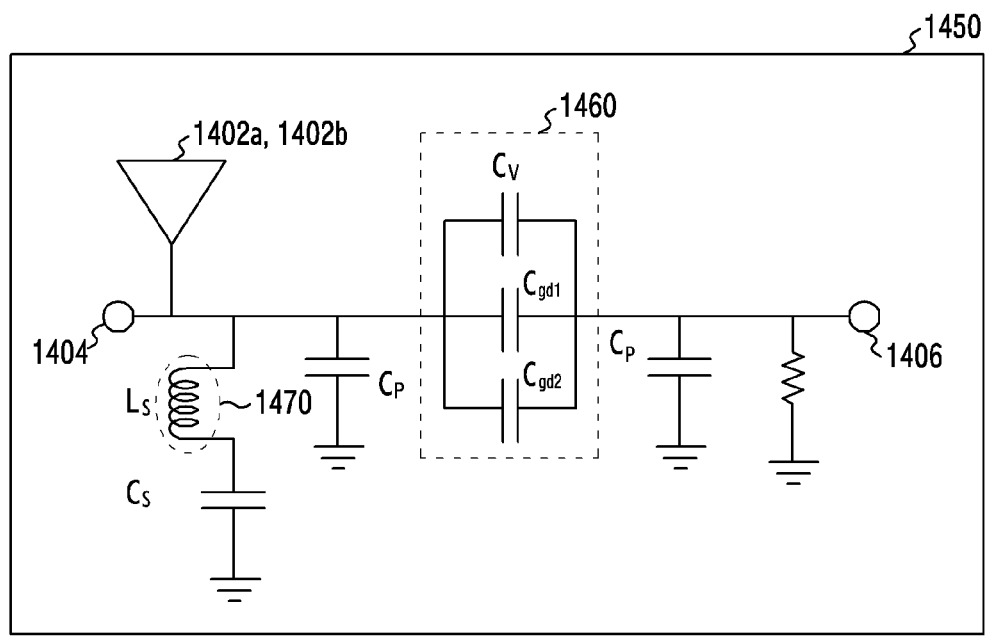
FIG. 14B illustrates an equivalent circuit for the fourth structure of the first type coupler in the antenna module according to various embodiments of the present disclosure.

FIG. 14B illustrates an equivalent circuit for the fourth structure of the first type coupler in the antenna module according to various embodiments of the present disclosure. FIG. 14B illustrates an equivalent circuit 1450 for the coupled line coupler implemented on the antenna board 1400 of FIG. 14A.

In the coupler shown in FIG. 14A, an inductor 1470 having inductance LS and a first capacitor having capacitance CS may be formed by the antenna matching stub 1412, and a second capacitor having capacitance CP may be formed between the line 1420 and the ground plane. In addition, a third capacitor having capacitance Cgd1 may be formed between the antenna matching stub 1412 and the first portion 1422 of the line 1420, and a fourth capacitor having capacitance Cgd2 may be formed the antenna matching stub 1412 and the third portion 1426 of the line 1420. Further, a fifth capacitor having capacitance CV may be formed between the antenna matching stub 1412 and the second portion 1424 of the line 1420. Hence, as shown in FIG. 14B, the return loss S11 of the signal inputted from the antenna port 1404 is determined based on the capacitance CS of the first capacitor, the capacitance CP of the second capacitor, the capacitance Cgd1 of the third capacitor, the capacitance Cgd2 of the fourth capacitor, the capacitance CV of the fifth capacitor, and the inductance LS. Herein, since the third capacitor, the fourth capacitor, and the fifth capacitor are connected in parallel, they may be interpreted as one equivalent capacitor 1460. Thus, capacitance CT of the equivalent capacitor 1460 may have a value of CT=Cgd1+Cgd2+CV. The capacitance CP of the second capacitor may be expressed as <Equation 1>. In addition, the capacitance Cgd1 of the third capacitor and the capacitance Cgd2 of the fourth capacitor among the capacitors formed by the lines may be expressed as <Equation 2>. Hence, by using the antenna matching stub on the antenna board and adjusting the spacing between the antenna matching stub and the line, the return loss S11 may be further reduced.

Figure 15A:
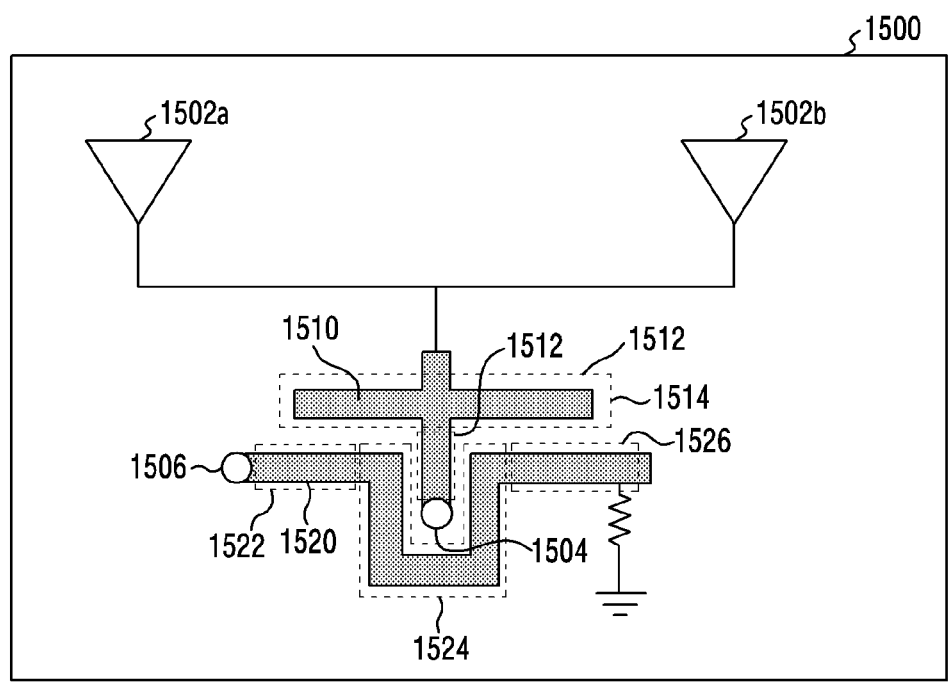
FIG. 15A illustrates a fifth structure of a first type coupler in an antenna module according to various embodiments of the present disclosure.

FIG. 15A illustrates a fifth structure of a first type coupler in an antenna module according to various embodiments of the present disclosure. FIG. 15A illustrates a further example of the coupler structure formed on the antenna board.

Referring to FIG. 15A, an antenna board 1500 includes antenna elements 1502a and 1502b, an antenna port 1504, a coupler port 1506, a line 1510 connected to the antenna port 1504 and the antenna elements 1502a and 1502b, and a line 1520 connected to the coupler port 1506 and a termination resistor. In addition, a via may be formed in each of the antenna port 1504 and the coupler port 1506. That is, the antenna board 1500 includes the antenna elements 1502a and 1502b and a coupler for extracting part of a signal transmitted to the plurality of the antenna elements 1502a and 1502b, and a calibration board may be disposed under the antenna board 1500, and include a correction circuit for correcting an error using the part of the signal extracted by the coupler.

The line 1510 which is a part of the feeding line may be connected directly to the antenna elements 1502a and 1502b with a first terminal end on the antenna board 1500 or may be indirectly connected by contacting a line between the antenna elements 1502a and 1502b. Also, the line 1510 may be disposed to contact the antenna port 1504 with a second terminal end, thus electrically connecting the calibration board below through the via formed in the antenna port 1504. In addition, the line 1510 may include a first portion operating as the main path of the coupler and a second portion 1512 operating as an antenna matching stub. Specifically, the first portion of the line 1510 may include a line portion disposed to proceed from the antenna port 1504 directly to the antenna elements 1502a and 1502b. That is, the first portion of the line 1510 indicates the line portion directly interconnecting the above-described first and second terminal ends without bypassing them. the first portion of the line 1510 may be disposed to be surrounded by the line 1520. In addition, the second portion 1512 of the line 1510 may be protruded to be distinguished from the first portion of the line 1510. Referring to FIG. 15A, the line 1510 may be disposed to have a T shape by crossing the first portion and the second portion. As mentioned earlier, the first portion of the line 1510 implemented on the antenna board 1500 is the main path of the coupled line coupler though which a signal destined for the antenna elements pass, and the second portion 1512 may be an element added as the antenna matching stub.

The line 1520 may be disposed to capacitively connect with the line 1510. Specifically, the line 1520 may be disposed to connect with the termination resistor on the antenna board 1500 with one terminal end. The line 1520 may be disposed to contact the coupler port 1506 with the other terminal end, and thus may be electrically connected with the calibration board below through the via formed in the coupler port 1506. In addition, the line 1520 may be formed to surround the first portion of the line 1510 building the main path of the coupler. Specifically, the line 1520 may include a first portion 1522 and a third portion 1526 including a line disposed adjacent and parallel to the antenna matching stub 1512 of the line 1510, and a second portion 1524 including a line disposed to surround the antenna matching stub 1512 with the line 1520 by interconnecting the first portion 1522 and the third portion 1526. The second portion 1524 of the line 1520 is a line connected with the first portion 1522 and the third portion 1526 with the respective terminal ends, and may be formed to surround the antenna port 1504 on the other side of the antenna matching stub 1512 based on the antenna port 1504. The first portion 1522 and the second portion 1524, and the third portion 1526 and the second portion 1524 form, but not limited to, the right angle in FIG. 15A. The first portion 1522 and the second portion 1524, and the third portion 1526 and the second portion 1524 may be disposed to form an arbitrary angle, or the second portion 1524 may be formed to be curved. The first portion 1522, the second portion 1524, and the third portion 1526 of the line 1520 implemented on the antenna board 1500 may operate as the sub path of the coupled line coupler as mentioned above.

Since the line operating as the sub path interacts with both sides of the line building the main path to thus form a double capacitor, the fifth structure of the first type coupler shown in FIG. 15A may further reduce the size of the coupler by increasing capacitance per unit length. In addition, by utilizing an inductor formed by the antenna matching stub for impedance matching, the return loss of the signal delivered to the antenna elements 1502a and 1502b may be further decreased. Further, by adjusting the spacings between the first portion operating as the main path in the line 1510 and the portions 1522, 1524, and 1526 of the line 1520 which is the sub path, the return loss of the signal delivered to the antenna elements 1502a and 1502b may be reduced.

Figure 15B:
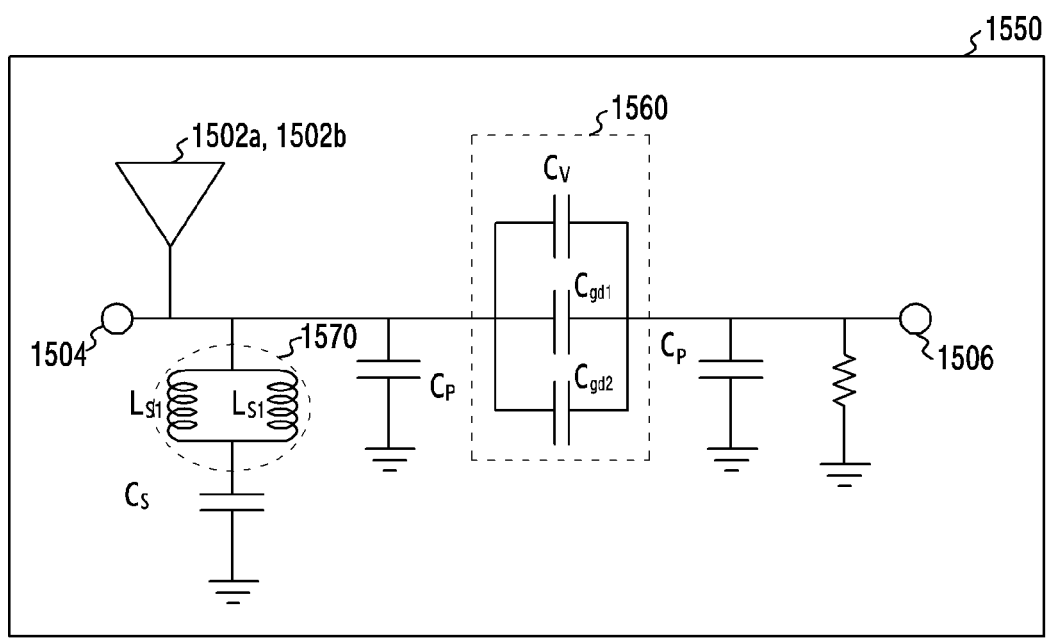
FIG. 15B illustrates an equivalent circuit for the fifth structure of the first type coupler in the antenna module according to various embodiments of the present disclosure.

FIG. 15B illustrates an equivalent circuit for the fifth structure of the first type coupler in the antenna module according to various embodiments of the present disclosure. FIG. 15B illustrates an equivalent circuit 1550 for the coupled line coupler implemented on the antenna board 1500 of FIG. 15A.

In the coupler shown in FIG. 15A, a parallel connection 1570 of a first inductor having inductance LS1 and a second inductor having inductance LS2 and a first capacitor having capacitance CS may be formed by the antenna matching stub 1512, and second capacitors having capacitance CP may be formed between the line 1520 and the ground plane. In addition, a third capacitor having capacitance Cgd1 may be formed between the first portion of the line 1510 and the first portion 1522 of the line 1520, and a fourth capacitor having capacitance Cgd2 may be formed between the first portion of the line 1510 and the third portion 1526 of the line 1520.

Further, a fifth capacitor having capacitance CV may be formed between the antenna port 1504 and the second portion 1524 of the line 1520. Hence, as shown in FIG. 15B, the return loss S11 of the signal inputted from the antenna port 1504 is determined based on the capacitance CS of the first capacitor, the capacitance CP of the second capacitor, the capacitance Cgd1 of the third capacitor, the capacitance Cgd2 of the fourth capacitor, the capacitance CV of the fifth capacitor, the first inductance LS1, and the second inductance LS2. Herein, since the third capacitor, the fourth capacitor, and the fifth capacitor are connected in parallel, they may be interpreted as one equivalent capacitor 1560. Thus, capacitance CT of the equivalent capacitor 1560 may have a value of CT=Cgd1+Cgd2+CV. The capacitance CP of the second capacitor may be expressed as <Equation 1>. In addition, the capacitance Cgd1 of the third capacitor and the capacitance Cgd2 of the fourth capacitor among the capacitors formed by the lines may be expressed as <Equation 2>. Thus, by using the antenna matching stub on the antenna board and adjusting the spacing between the antenna matching stub and the line, the return loss S11 may be further reduced.

Hereafter, a second type coupler structure implemented on a calibration board among coupler structures of two types for canceling interference due to vias formed in an antenna array and reducing insertion loss due to a bypass path is described in detail, in FIG. 16 through FIG. 19B.

Figure 16:
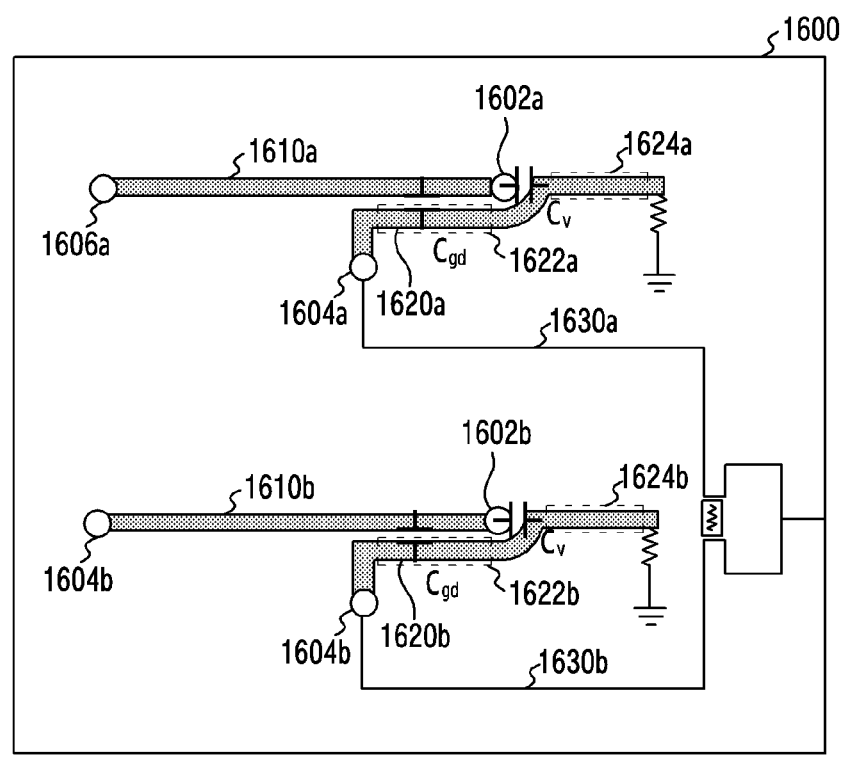
FIG. 16 illustrates a first structure of a second type coupler in an antenna module according to various embodiments of the present disclosure.

FIG. 16 illustrates a first structure of a second type coupler in an antenna module according to various embodiments of the present disclosure. FIG. 16 illustrates an example of the coupler structure formed on a calibration board.

Referring to FIG. 16, a calibration board 1600 includes antenna ports 1602a and 1602b, coupler ports 1604a and 1604b, filter ports 1606a and 1606b, lines 1610a and 1610b connecting the antenna ports 1602a and 1602b and the filter ports 1606a and 1606b respectively, and lines 1620a and 1620b connecting the coupler ports 1604a and 1604b and termination resistors respectively. In addition, a via may be formed in each of the antenna ports 1602a and 1602b, the coupler ports 1604a and 1604b, and the filter ports 1606a and 1606b. The shape of the coupler shown in the upper section of FIG. 16 is described for convenience of explanation, and the following descriptions may be equally applied to the coupler shown in the lower section.

The line 1610a which is a part of the feeding line may be disposed to connect with the antenna port 1602a with one terminal end on the calibration board 1600, thus transmitting a signal to the antenna elements of the upper antenna board. In addition, the line 1610a is disposed to connect with the filter port 1606a with the other terminal end of the line 1610a, and accordingly a signal passing through the lower filter may pass through the lines formed on the calibration board. As described above, the line 1610a is a path through which the signal delivered to the antenna elements passes, and may operate as the main path of the coupled line coupler.

The line 1620a may include a first portion 1622a and a second portion 1624a. The first portion 1622a may include a line contacting the coupler port 1604a with one terminal end, and may be disposed adjacent to and parallel to the line 1610a. That is, a position of the via for the coupler port 1604a may be determined, such that a part of the line connected to the coupler port may be disposed adjacent to the line 1610a. In addition, the second portion 1624a may be disposed to be apart from the antenna port 1602a with a specific spacing and to form a straight line with the line 1610a. One terminal end of the second portion 1624a may be connected with the termination resistor. In addition, the first portion 1620a and the second portion 1624a may be connected to each other through a line surrounding a via hole formed in the antenna port 1602a. As described above, the line 1620a connected to the coupler port 1604a may operate as the sub path of the coupled line coupler.

In this case, on the calibration board, the coupler may be implemented without a bypass path for securing the length of λ/4 for the coupling lines constructing the coupler, that is, the main path and the sub path. In addition, by using not only the capacitor between the lines building the main path and the line building the sub path but also the capacitor formed between the via formed in the antenna port and the line, the coupler structure shown in FIG. 16 may reduce the return loss of the signal delivered to the antenna elements. Also, if the coupler is implemented on the calibration board, a calibration network including the coupler may be configured conveniently.

Figure 17A:
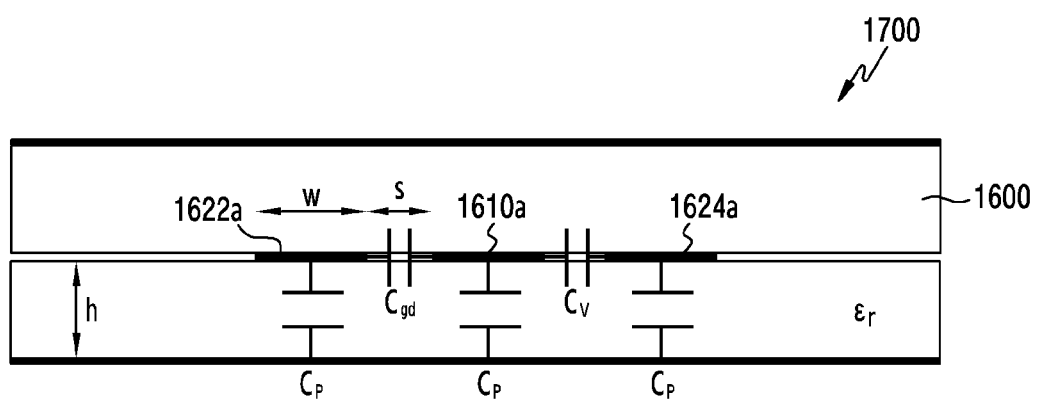
FIG. 17A illustrates an equivalent circuit from a side of a first structure of a second type coupler in an antenna module according to various embodiments of the present disclosure.
Figure 17B:
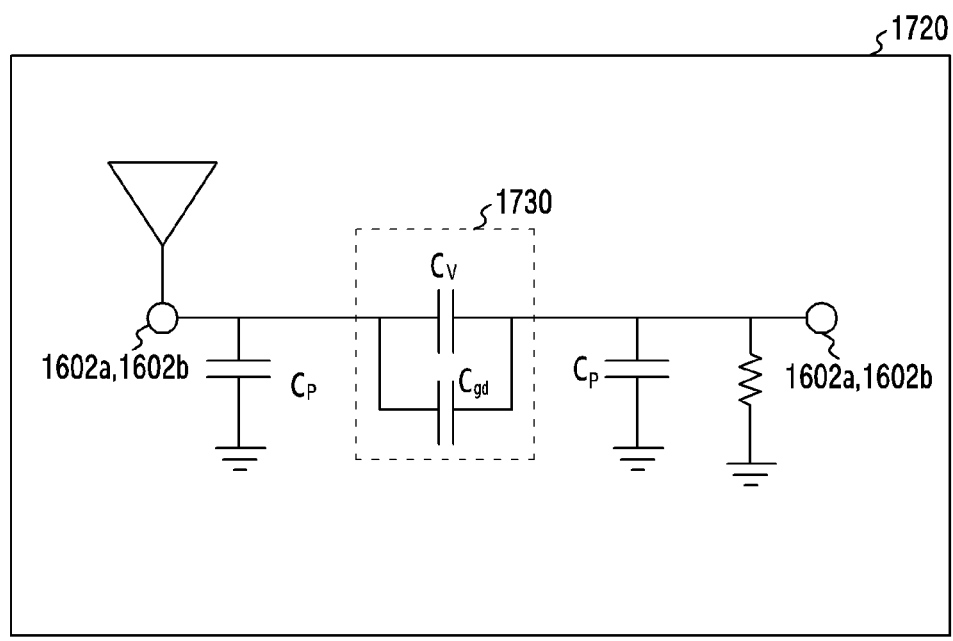
FIG. 17B illustrates an equivalent circuit for the first structure of the second type coupler in the antenna module according to various embodiments of the present disclosure.

FIG. 17A illustrates an equivalent circuit from a side of a first structure of a second type coupler in an antenna module according to various embodiments of the present disclosure. FIG. 17B illustrates an equivalent circuit for the first structure of the second type coupler in the antenna module according to various embodiments of the present disclosure. FIG. 17A and FIG. 17B illustrate the equivalent circuits for the coupled line coupler implemented on the calibration board 1600 of FIG. 16.

Referring to FIG. 17A, a first capacitor may be formed each between the line 1610a and the ground plane, between the first portion 1622a of the line 1620a and the ground plane, and between the second portion 1624a of the line 1620a and the ground plane. In addition, a second capacitor may be formed between the line 1610a and the first portion 1622a of the line 1620a, and a third capacitor may be formed between the line 1610a and the second portion 1624a of the line 1620a. As shown in FIG. 17B, the return loss S11 of the signal inputted from the antenna port 1602a is determined based on the capacitance CP of the first capacitor, the capacitance Cgd of the second capacitor, and the capacitance CV of the third capacitor. Herein, since the second capacitor and the third capacitor are connected in parallel, they may be interpreted as one equivalent capacitor 1730. Accordingly, capacitance CT of the equivalent capacitor 1730 may have a value of CT=Cgd+CV. The capacitance CP of the first capacitor among the capacitors formed by the lines may be expressed as <Equation 1>. In addition, the capacitance Cgd of the second capacitor among the capacitors formed by the lines may be expressed as <Equation 2>. Thus, the coupler for reducing the return loss S11 may be implemented, by controlling the capacitance by adjusting the spacings between the lines constructing the coupler on the calibration board.

Figure 18A:
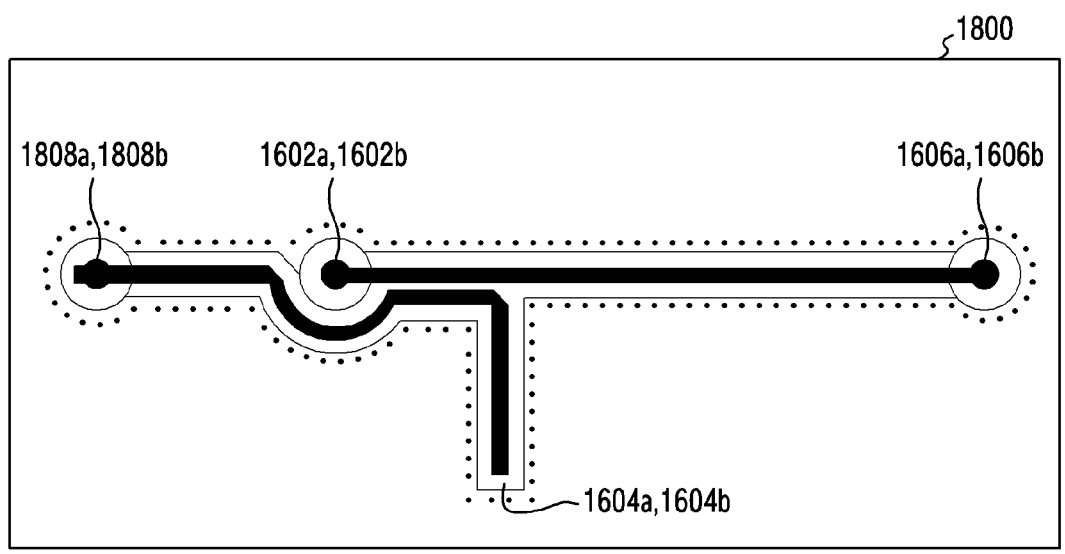
FIG. 18A illustrates a simulation environment for a first structure of a second type coupler in an antenna module according to various embodiments of the present disclosure.
Figure 18B:
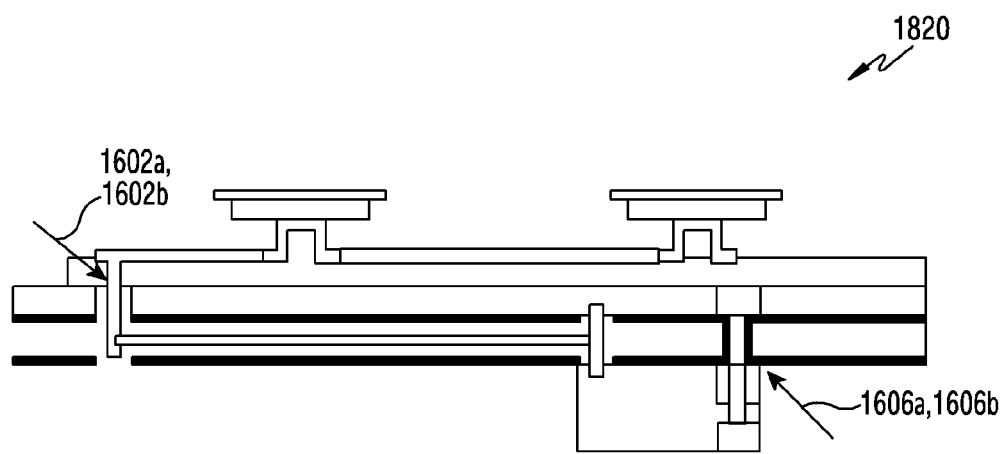
FIG. 18B illustrates a cross section of the first structure of the second type coupler in the antenna module according to various embodiments of the present disclosure.
Figure 18C:
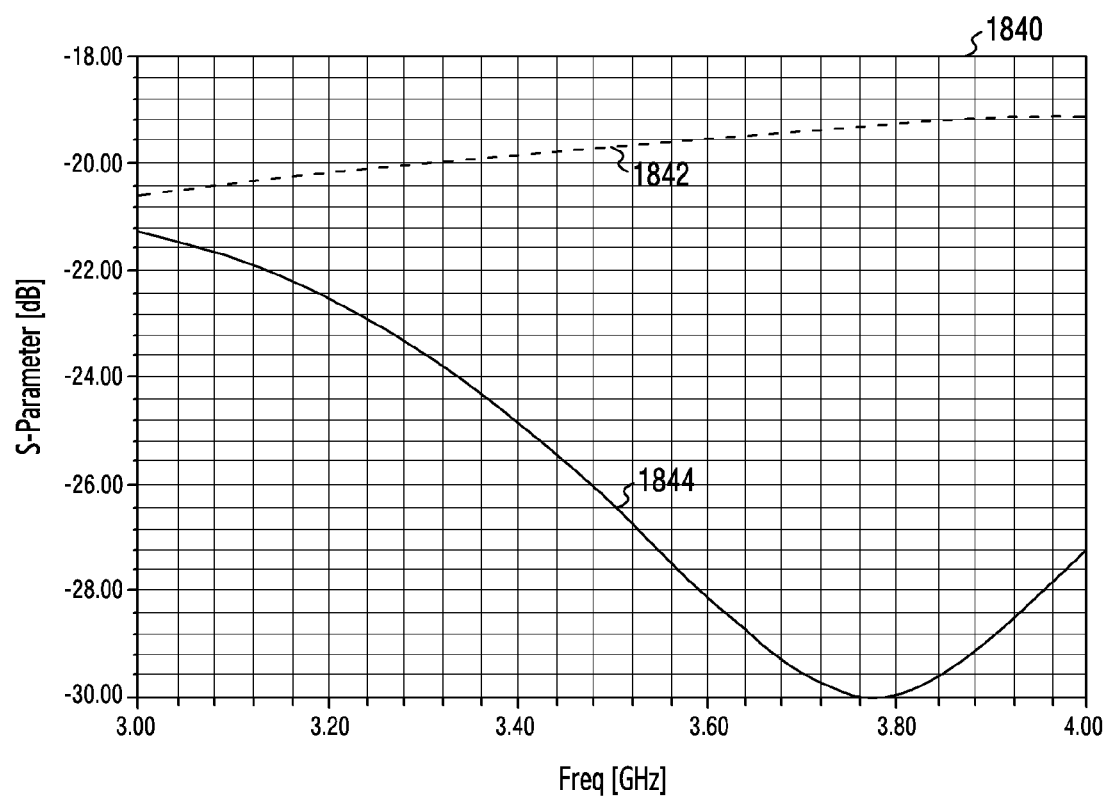
FIG. 18C illustrates simulation results of the first structure of the second type coupler in the antenna module according to various embodiments of the present disclosure.

FIG. 18A illustrates a simulation environment for a first structure of a second type coupler in an antenna module according to various embodiments of the present disclosure. FIG. 18B illustrates a cross section of the first structure of the second type coupler in the antenna module according to various embodiments of the present disclosure. FIG. 18C illustrates simulation results of the first structure of the second type coupler in the antenna module according to various embodiments of the present disclosure.

Referring to FIG. 18A, the coupler may be implemented to include a main path for inputting a signal to the antenna ports 1602a and 1602b and delivering it to the antenna elements, and a sub path for connecting the coupler ports 1604a and 1604b for extracting signal and isolation ports 1808a and 1808b. The isolation ports 1808a and 1808b are connected with the termination resistor having the resistance value of 50 ohms. Referring to a side 1820 of the antenna module in which the above-described coupler is implemented, a signal is delivered on the calibration board through the filter ports 1606a and 1606b, and the signal is delivered to the antenna board on the calibration board through the antenna ports 1602a and 1602b. In the simulation environment of the coupler shown in FIG. 18A, a curve 1842 representing S parameter values for a signal component extracted through the coupler port and a curve 1844 representing S parameter values for a signal component reflected back to the input port are shown in a signal frequency range from 3.00 GHz to 4.00 GHz in FIG. 18C. Referring to FIG. 18C, in the signal frequency range from 3.00 GHz to 4.00 GHz, the S parameter values 1842 for the signal component extracted through the coupler port are maintained within the range of −19.20 dB to −20.50 dB. That is, the coupler with the reduced size while maintaining the signal component extraction performance may be used.

Figure 19A:
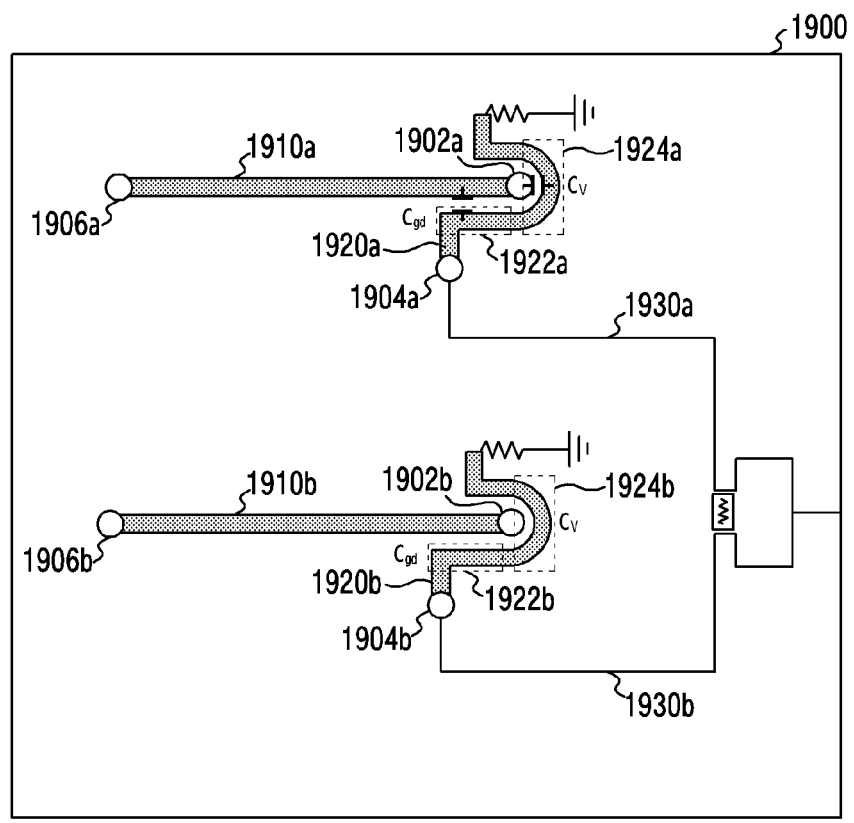
FIG. 19A illustrates a second structure of a second type coupler in an antenna module according to various embodiments of the present disclosure.

FIG. 19A illustrates a second structure of a second type coupler in an antenna module according to various embodiments of the present disclosure. FIG. 19A illustrates another example of a coupler structure formed on a calibration board.

Referring to FIG. 19A, a calibration board 1900 may include antenna ports 1902a and 1902b, coupler ports 1904a and 1904b, filter ports 1906a and 1906b, lines 1910a and 1910b connecting the antenna ports 1902a and 1902b and the filter ports 1906a and 1906b respectively, and lines 1920a and 1920b connecting the coupler ports 1904a and 1904b and termination resistors respectively. In addition, a via may be formed in each of the antenna ports 1902a and 1902b, the coupler ports 1904a and 1904b, and the filter ports 1906a and 1906b. The shape of the coupler shown in the upper section of FIG. 19A is described for convenience of explanation, and the following descriptions may be equally applied to the coupler shown in the lower section.

The line 1910a which is a part of the feeding line is disposed to connect with the antenna port 1902a with one terminal end on the calibration board 1900, and accordingly a signal may be transmitted to antenna elements of the upper antenna board. In addition, the line 1910a is disposed to connect with the filter port 1906a with the other terminal end of the line 1910a, and thus the signal passing through the lower filter may pass through the lines formed on the calibration board. As described above, the line 1910a is a path through which the signal delivered to the antenna elements passes, and may operate as the main path of the coupled line coupler.

The line 1920a may include a first portion 1922a and a second portion 1924a. The first portion 1922a may include a line contacting the coupler port 1904a with one terminal end, and may be disposed to be adjacent and parallel to a first side of the line 1910a. That is, a position of the via for the coupler port 1904a may be determined to arrange a part of the line connected to the coupler port to be adjacent to the line 1910a. Herein, the side of the line 1910a may indicate a surface parallel to a direction in which the line travels from the antenna port 1902a. In addition, the second portion 1924a may be formed to surround a via hole formed in the antenna port 1902a. Specifically, the second portion 1924a may be formed to surround the antenna port 1902a on the opposite side of the line 1910a based on the antenna port 1902a. Further, the other terminal end not connected to the first portion 1922a in the second portion 1924a may be connected with the termination resistor through a line disposed adjacent and parallel to a second side of the line 1910a. As described above, the line 1920a connected to the coupler port 1904a may operate as the sub path of the coupled line coupler.

In this case, on the calibration board, the coupler may be implemented without a bypass path for securing the length of λ/4 for the coupling lines constructing the coupler, that is, the main path and the sub path. In addition, the second structure of the second type coupler shown in FIG. 19A has the form in which the line operating as the sub path may form a double capacitor on both sides of the line operating as the main path, and thus the size of the coupler may be further reduced by increasing the capacitance per unit length. In addition, by using the capacitor formed the vias formed in the antenna port and the line as well as the capacitor between the line building the main path and the line building the sub path, the return loss of the signal delivered to the antenna elements may be reduced. Further, if the coupler is implemented on the calibration board, calibration network configuration including the coupler may be facilitated.

Figure 19B:
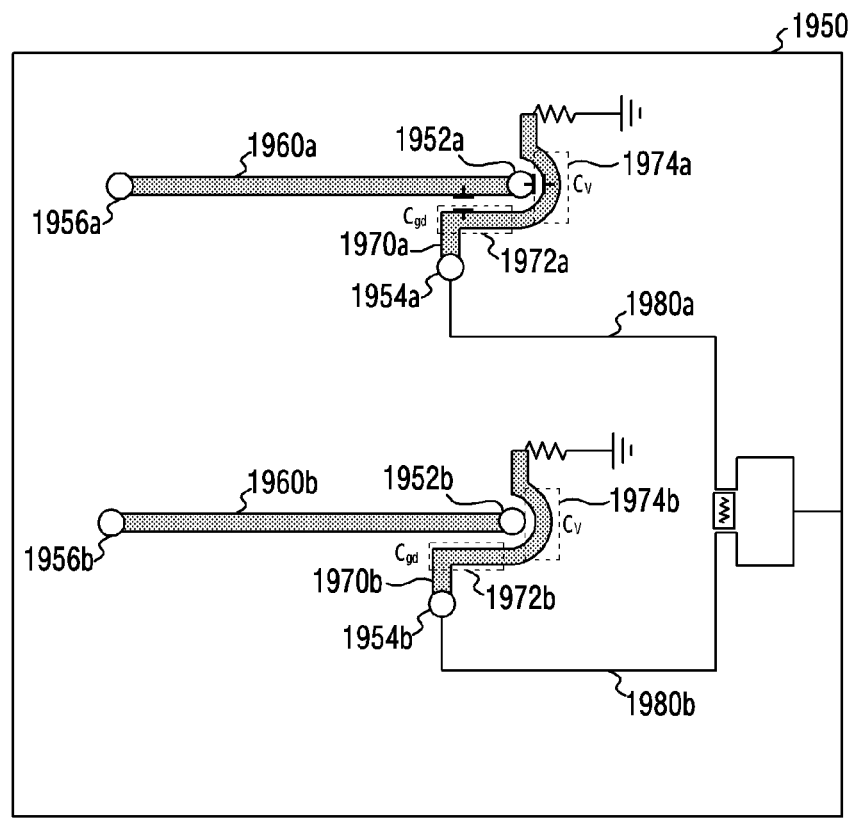
FIG. 19B illustrates a third structure of the second type coupler in the antenna module according to various embodiments of the present disclosure.

FIG. 19B illustrates the third structure of the second type coupler in the antenna module according to various embodiments of the present disclosure. FIG. 19B shows yet another example of the coupler structure formed on the calibration board.

Referring to FIG. 19B, a calibration board 1950 may include antenna ports 1952a and 1952b, coupler ports 1954a and 1954b, filter ports 1956a and 1956b, lines 1960a and 1960b connecting the antenna ports 1952a and 1952b and the filter ports 1956a and 1956b respectively, and lines 1970a and 1970b connecting the coupler ports 1954a and 1954b and termination resistors respectively. In addition, a via may be formed in each of the antenna ports 1952a and 1952b, the coupler ports 1954a and 1954b, and the filter ports 1956a and 1956b. A shape of the coupler shown in the upper section of FIG. 19B is described for convenience of explanation, and the following descriptions may be equally applied to the coupler shown in the lower section.

The line 1960a which is a part of the feeding line is disposed to connect with the antenna port 1952a with one terminal end on the calibration board 1950, and accordingly a signal may be transmitted to antenna elements of the upper antenna board. Also, by arranging the line 1960a to connect with the filter port 1956a with the other terminal end of the line 1960a, a signal passing through the lower filter may pass through the lines formed on the calibration board. As described above, the line 1960a is a path through which the signal delivered to the antenna elements passes, and may operate as the main path of the coupled line coupler.

The line 1970a may include a first portion 1972a and a second portion 1974a. The first portion 1972a may include a line contacting the coupler port 1954a with one terminal end, and may be disposed to be adjacent and parallel to a first side of the line 1960a. That is, the position of the via for the coupler port 1954a may be determined, such that a part of the line connected to the coupler port may be disposed adjacent to the line 1960a. Herein, the side of the line 1960a may indicate a surface parallel to a direction in which the line travels from the antenna port 1952a. In addition, the second portion 1974a may be formed to surround a via hole formed in the antenna port 1952a. Specifically, the second portion 1974a may be formed to surround the antenna port 1952a on the opposite side of the line 1960a based on the antenna port 1952a. Further, the other terminal end not connected with the first portion 1972a in the second portion 1974a may be connected to the termination resistor. As described above, the line 1970a connected to the coupler port 1954a may operate as the sub path of the coupled line coupler.

In this case, on the calibration board, the coupler may be implemented without a bypass path for securing the length of λ/4 for the coupling lines constructing the coupler, that is, the main path and the sub path. In addition, by using the capacitor formed the vias formed in the antenna port and the line as well as the capacitor between the main path and the sub path, the coupler size and the return loss of the signal delivered to the antenna elements may be reduced by increasing the capacitance per unit length. Further, if the coupler is implemented on the calibration board, calibration network configuration including the coupler may be facilitated.

Figure 20A:
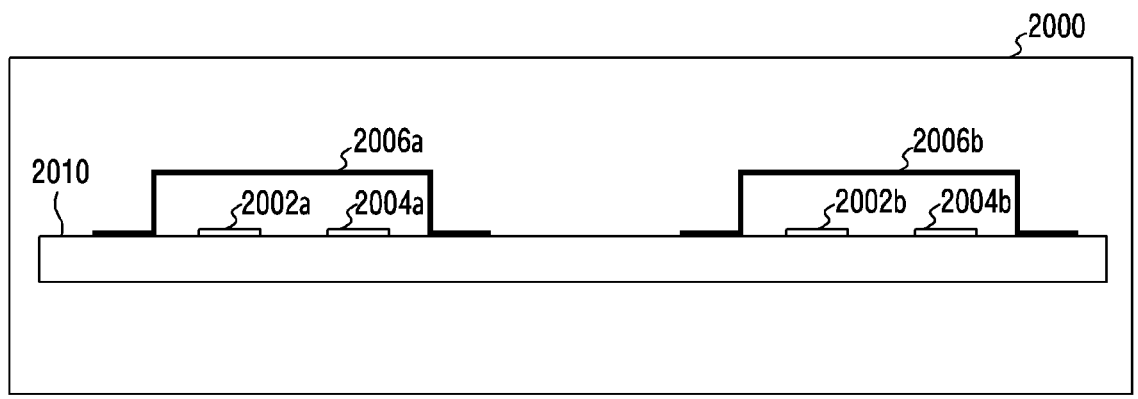
FIGS. 20A and 20B illustrate examples of a structure for shielding couplers in an antenna module according to various embodiments of the present disclosure.
Figure 20B:
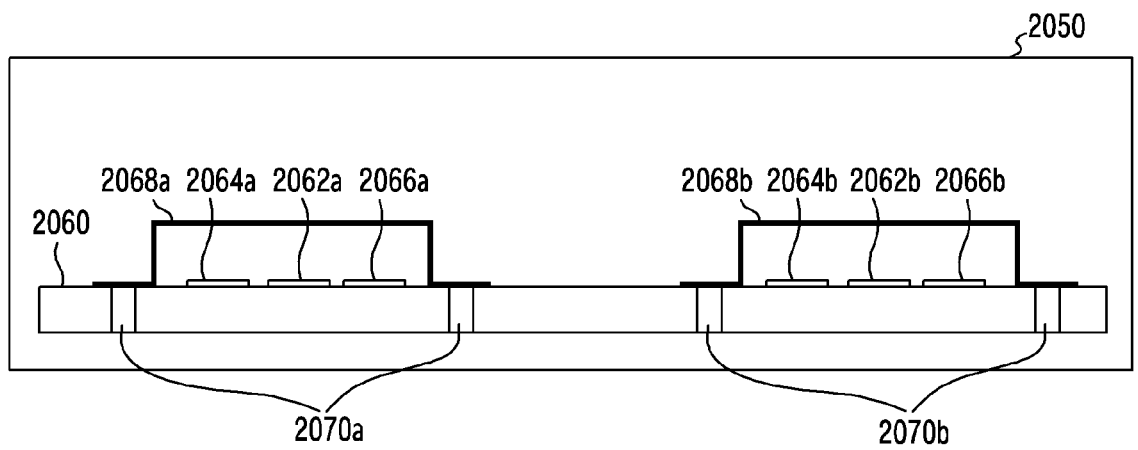

FIGS. 20A and 20B illustrate examples of a structure for shielding couplers in an antenna module according to various embodiments of the present disclosure. FIG. 20A and FIG. 20B illustrate that the couplers are disposed on an antenna board.

Referring to FIG. 20A, a feeding line 2002a and a coupling line 2004a constructing a first coupler and a feeding line 2002b and a coupling line 2004b constructing a second coupler are disposed on an antenna board 2010. That is, the couplers mounted in FIG. 20A may have the same structure as the coupler shown in FIG. 6. The first coupler is to extract a signal delivered to first antenna elements through the feeding line 2002a, and may be required to block signals delivered to other antenna elements. Similarly, the second coupler is to extract a signal delivered to second antenna elements through the feeding line 2002b, and may be required to block signals transmitted to other antenna elements including the first antenna elements. Hence, at least one structure for shielding the coupler may be formed on the antenna board. That is, at least one of a structure 2006a for shielding the first coupler or a structure 2006b for shielding the second coupler may be implemented over the corresponding coupler. For example, the structure for shielding the coupler is a sealed can, and may be implemented using a metal material. The coupling structures 2006a and 2006b each may be securely mounted on the antenna board 2010, by coupling portions contacting the antenna board 2010 by use of coupling components (e.g., a rivet, surface mounter technology (SMT)). Further, shielding performance may be further improved, by additionally forming vias penetrating the antenna board 2010, under the portions of the structures 2006a and 2006b contacting the antenna board 2010.

Referring to FIG. 20B, a feeding line 2062a and coupling lines 2064a and 2066a constructing a first coupler, and a feeding line 2062b and coupling lines 2064b and 2066b constructing a second coupler are disposed on an antenna board 2050. That is, the couplers mounted in FIG. 20B may have the same structure as at least one of the couplers shown in FIG. 9, FIG. 12, FIG. 14A, and FIG. 15A. In the same manner as FIG. 20A, it is required to block signals delivered to other antenna elements, and accordingly the first coupler and the second coupler may be shielded by structures for shielding the couplers respectively. For example, other signals than the signal passing through the feeding line 2062a may be blocked by mounting a structure 2068a over the first coupler, and other signals than the signal passing through the feeding line 2062b may be blocked by mounting a structure 2068b over the second coupler. In addition, the structure for shielding the coupler is a shield can, and may be implemented using a metal material. The coupling structures 2068a and 2068b each may be securely mounted on the antenna board 2060, by coupling portions contacting the antenna board 2060 by use of coupling components (e.g., a rivet, SMT). Further, shielding performance may be further improved, by additionally forming vias 2070a and 2070b penetrating the antenna board 2060, under the portions of the structures 2068a and 2068b contacting the antenna board 2060.

Figure 21A:
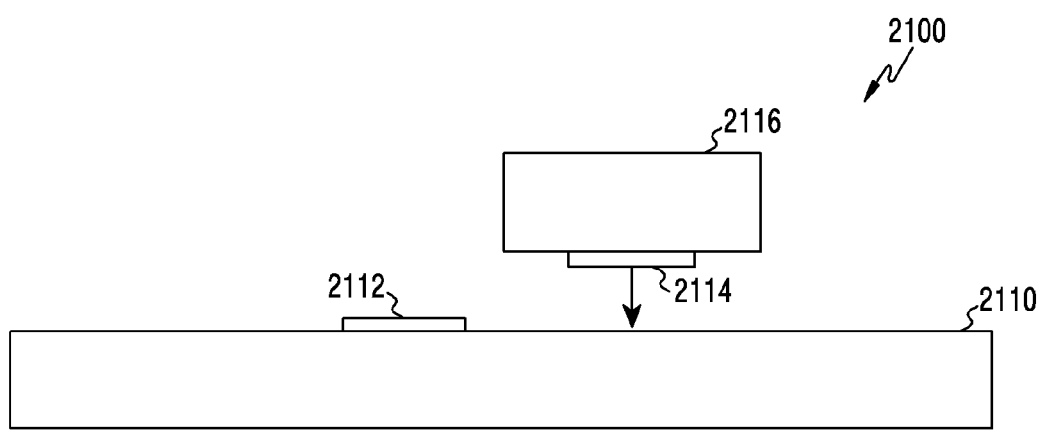
FIGS. 21A and 21B illustrate examples of a structure using a coupler line to which a dielectric is attached in an antenna module according to various embodiments of the present disclosure.
Figure 21B:
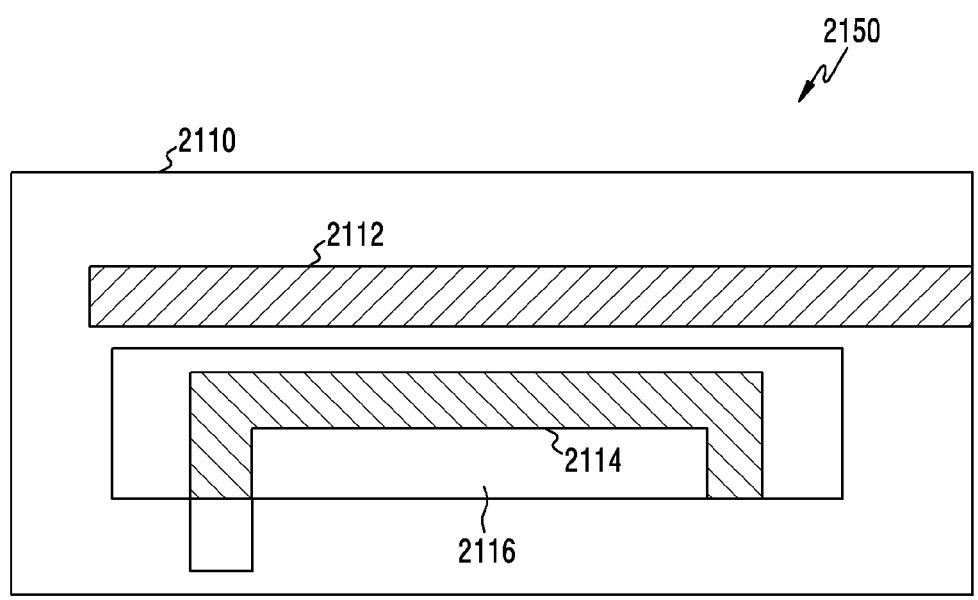

FIGS. 21A and 21B illustrate an example of a structure using a coupler line to which a dielectric is attached in an antenna module according to various embodiments of the present disclosure. FIG. 21A and FIG. 21B illustrate that a coupler is disposed on an antenna board.

Referring to FIG. 21A, a side surface 2100 of a structure in which a feeding line 2112 and a coupling line 2114 constructing a coupler are disposed on an antenna board 2110 is shown. In addition, referring to FIG. 21B, a plane 2150 viewed from above the structure in which the feeding line 2112 and the coupling line 2114 constructing the coupler are disposed on the antenna board 2110 is shown. Specifically, the coupling line 2114 may be disposed on the antenna board 2110 with a dielectric 2116 attached onto the coupling line 2114. In this case, since capacitance per unit length increases thanks to the attachment of the dielectric 2116 having a high dielectric constant, the length of the line constructing the coupler may be reduced.

Figure 22A:
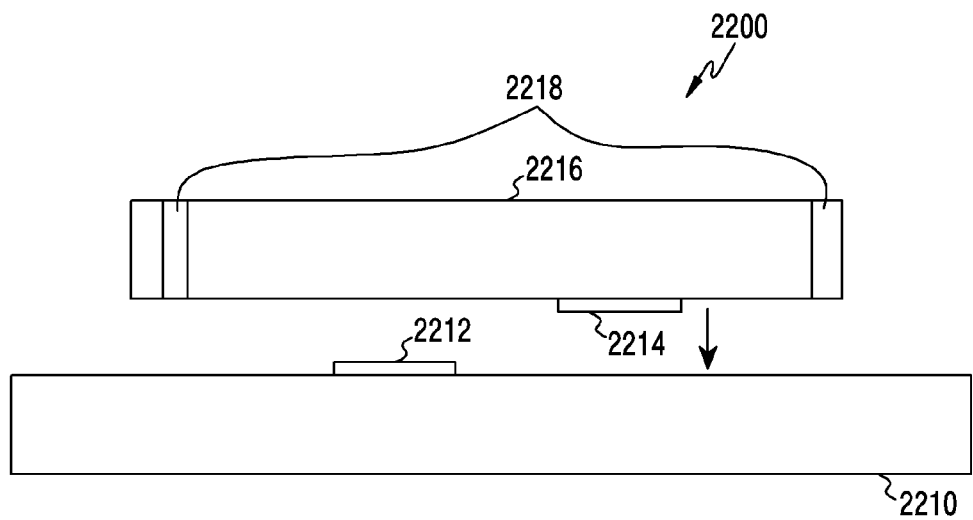
FIGS. 22A and 22B illustrate another example of a structure using a coupler line to which a dielectric is attached in an antenna module according to various embodiments of the present disclosure.
Figure 22B:
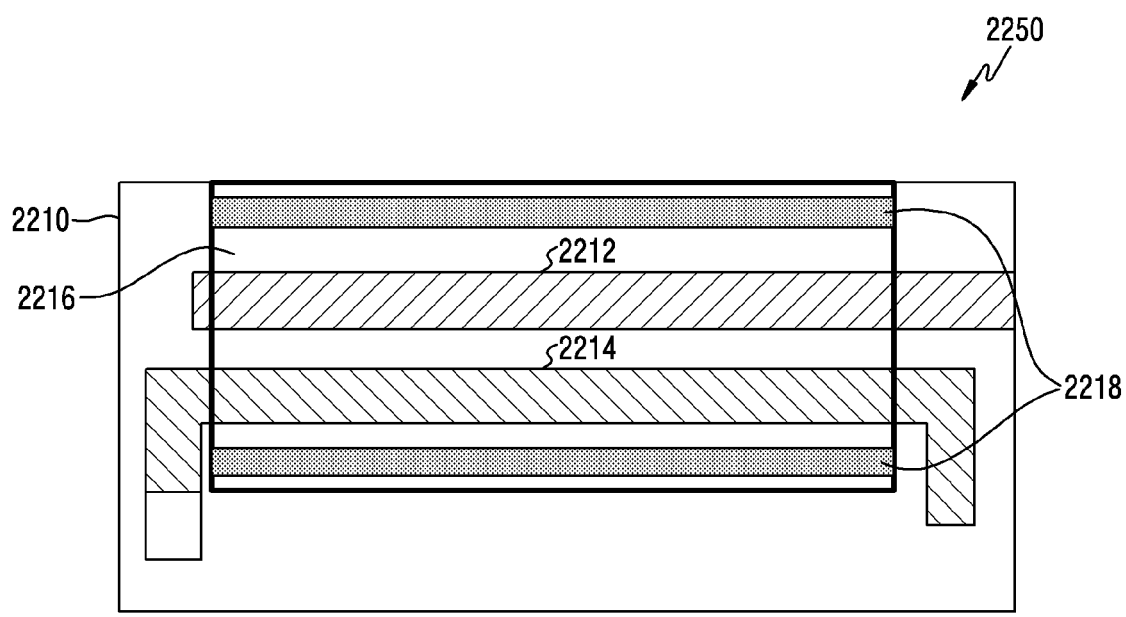

FIGS. 22A and 22B illustrate another example of a structure using a coupler line to which a dielectric is attached in an antenna module according to various embodiments of the present disclosure. FIG. 22A and FIG. 22B illustrate that a coupler is disposed on an antenna board.

Referring to FIG. 22A, a side surface 2200 of a structure in which a feeding line 2212 and a coupling line 2214 constructing a coupler are disposed on an antenna board 2210 is shown. In addition, referring to FIG. 22B, a plane 2250 viewed from above the structure in which the feeding line 2212 and the coupling line 2214 constructing coupler are disposed on the antenna board 2210 is shown. Specifically, the coupling line 2214 may be disposed on the antenna board 2210 with a dielectric 2216 attached onto the coupling line 2214. In this case, since the capacitance per unit length increases thanks to the attachment of the dielectric 2216 having a high dielectric constant, the length of the line constructing the coupler may be reduced. In addition, vias 2218 may be formed at both ends of the dielectric 2216 for isolation from other ports.

An antenna device according to an embodiment of the present disclosure as stated above, may include an antenna board including a plurality of antenna elements and a coupler for extracting part of a signal transmitted to the plurality of the antenna elements and a calibration board disposed under the antenna board, and including a correction circuit for correcting an error using the part of the signal extracted by the coupler, the coupler may include a first transmission line connected with the plurality of the antenna elements and a second transmission line disposed to be capacitively connected with the first transmission line, and the second transmission line may include a third transmission line and a fourth transmission line spaced apart from each other to be parallel to the first transmission line based on the first transmission line and a fifth transmission line disposed to connect with the third transmission line and the fourth transmission line with respective terminal ends, and to surround a via hole penetrating the antenna board in a vertical direction.

In an embodiment, the first transmission line may build a main path of the coupler through which the signal is delivered to the plurality of the antenna elements, and the second transmission line may build a sub path of the coupler for extracting the part of the signal.

In an embodiment, the third transmission line may be connected to a coupler port of the coupler for delivering the extracted signal to the correction circuit, and the fourth transmission line may be connected to an isolation port of the coupler connected to a termination resistor.

In an embodiment, the antenna port may correspond to the via hole, and a return loss of the signal measured at the antenna port may be controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line.

In an embodiment, the fifth transmission line may be formed by a plurality of vias.

In an embodiment, the antenna board may further include a stub for impedance matching protruding from the first transmission line and disposed not to be parallel to the first transmission line, and the stub may be disposed to be spaced from the second transmission line.

In an embodiment, the antenna port may correspond to the via hole, and a return loss of the signal measured at the antenna port may be controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line and inductance formed by the stub.

In an embodiment, the antenna board may further include a structure for shielding the coupler, the structure may be disposed to cover an upper portion of the coupler, and both terminal ends of the structure may be fixed to the antenna board by a component for coupling.

In an embodiment, vias vertically penetrating the antenna board may be formed, at portions which contact both terminal ends of the structure.

In an embodiment, the second transmission line may include a first surface and a second surface parallel to the first surface, a dielectric may be attached to the first surface of the second transmission line, and the second transmission line may be mounted on the antenna board through the second surface.

An electronic device according to an embodiment of the present disclosure as stated above, may include at least one processor and an antenna device, the antenna device may include an antenna board including a plurality of antenna elements and a coupler for extracting part of a signal delivered to the plurality of the antenna elements and a calibration board disposed under the antenna board, and including a correction circuit for correcting an error using the part of the signal extracted by the coupler, the coupler may include a first transmission line connected with the plurality of the antenna elements and a second transmission line disposed to be capacitively connected with the first transmission line, and the second transmission line may include a third transmission line and a fourth transmission line spaced apart from each other to be parallel to the first transmission line based on the first transmission line and a fifth transmission line disposed to connect with the third transmission line and the fourth transmission line with respective terminal ends, and to surround a via hole penetrating the antenna board in a vertical direction.

In an embodiment, the first transmission line may build a main path of the coupler through which the signal is delivered to the plurality of the antenna elements, and the second transmission line may build a sub path of the coupler for extracting the part of the signal.

In an embodiment, the third transmission line may be connected to a coupler port of the coupler for delivering the extracted signal to the correction circuit, and the fourth transmission line may be connected to an isolation port of the coupler connected to a termination resistor.

In an embodiment, the antenna port may correspond to the via hole, and a return loss of the signal measured at the antenna port may be controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line.

In an embodiment, the fifth transmission line may be formed by a plurality of vias.

In an embodiment, the antenna board may further include a stub for impedance matching protruding from the first transmission line and disposed not to be parallel to the first transmission line, and the stub may be disposed to be spaced from the second transmission line.

In an embodiment, the antenna port may correspond to the via hole, and a return loss of the signal measured at the antenna port may be controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line and inductance formed by the stub.

In an embodiment, the antenna board may further include a structure for shielding the coupler, the structure may be disposed to cover an upper portion of the coupler, and both terminal ends of the structure may be fixed to the antenna board by a component for coupling.

In an embodiment, vias vertically penetrating the antenna board may be formed, at portions which contact both terminal ends of the structure.

In an embodiment, the second transmission line may include a first surface and a second surface parallel to the first surface, a dielectric may be attached to the first surface of the second transmission line, and the second transmission line may be mounted on the antenna board through the second surface.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Therefore, the scope of the present disclosure is not limited and defined by the described embodiment and is defined not only the scope of the claims as below but also their equivalents.

The invention claimed is:

1. An antenna device in a wireless communication system, the antenna device comprising:
   an antenna board comprising a plurality of antenna elements and a coupler for extracting a part of a signal transmitted to the plurality of the antenna elements; and
   a calibration board disposed under the antenna board, and comprising a correction circuit for correcting an error using the part of the signal extracted by the coupler,
   wherein the coupler disposed on the antenna board comprises:
      a first transmission line connected with the plurality of the antenna elements, wherein the first transmission line feeds power to the plurality of antenna elements; and
      a second transmission line disposed to be capacitively connected with the first transmission line,
   wherein the second transmission line comprises:
      a third transmission line and a fourth transmission line spaced apart from each other to be parallel to at least a part of the first transmission line; and
      a fifth transmission line disposed to be connected with the third transmission line at a first end and the fourth transmission line at a second end, and to surround a via hole corresponding to an antenna port and penetrating the antenna board in a vertical direction, and
   wherein the first transmission line electrically connects the via hole corresponding to the antenna port and the plurality of antenna elements.

2. The antenna device of claim 1, wherein the first transmission line builds a main path of the coupler through which the signal is delivered to the plurality of the antenna elements, and
   the second transmission line builds a sub path of the coupler for extracting the part of the signal.

3. The antenna device of claim 1, wherein the third transmission line is connected to a coupler port of the coupler for delivering the extracted signal to the correction circuit, and
   the fourth transmission line is connected to an isolation port of the coupler connected to a termination resistor.

4. The antenna device of claim 1, wherein
   a return loss of the signal measured at the antenna port is controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line.

5. The antenna device of claim 1, wherein the fifth transmission line is formed by a plurality of vias.

6. The antenna device of claim 1, wherein the antenna board further comprises a stub for impedance matching protruding from the first transmission line and disposed not to be parallel to the first transmission line, and
   wherein the stub is disposed to be spaced from the second transmission line.

7. The antenna device of claim 6, wherein
   a return loss of the signal measured at the antenna port is controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line and inductance formed by the stub.

8. The antenna device of claim 1, wherein the antenna board further comprises a structure for shielding the coupler,
   wherein the structure is disposed to cover an upper portion of the coupler, and
   both ends of the structure are fixed to the antenna board by a component for coupling.

9. The antenna device of claim 8, wherein vias vertically penetrating the antenna board are formed, at portions which contact both ends of the structure.

10. The antenna device of claim 1, wherein the second transmission line comprises a first surface and a second surface parallel to the first surface,
    a dielectric is attached to the first surface of the second transmission line, and
    the second transmission line is mounted on the antenna board through the second surface.

11. An electronic device in a wireless communication system, the electronic device comprising:
    at least one processor; and
    an antenna device,
       wherein the antenna device comprises,
       an antenna board comprising a plurality of antenna elements and a coupler for extracting a part of a signal delivered to the plurality of the antenna elements; and
       a calibration board disposed under the antenna board, and comprising a correction circuit for correcting an error using the part of the signal extracted by the coupler,
    wherein the coupler disposed on the antenna board comprises,
       a first transmission line connected with the plurality of the antenna elements, wherein the first transmission line feeds power to the plurality of antenna elements; and a second transmission line disposed to be capacitively connected with the first transmission line, wherein the second transmission line comprises:

a third transmission line and a fourth transmission line spaced apart from each other to be parallel to at least a part of the first transmission line; and a fifth transmission line disposed to be connected with the third transmission line at a first end and the fourth transmission line at a second end, and to surround a via hole corresponding to an antenna port and penetrating the antenna board in a vertical direction, and wherein the first transmission line electrically connects the via hole corresponding to the antenna port and the plurality of antenna elements.

12. The electronic device of claim 11, wherein the first transmission line builds a main path of the coupler through which the signal is delivered to the plurality of the antenna elements, and the second transmission line builds a sub path of the coupler for extracting the part of the signal.

13. The electronic device of claim 11, wherein the third transmission line is connected to a coupler port of the coupler for delivering the extracted signal to the correction circuit, and the fourth transmission line is connected to an isolation port of the coupler connected to a termination resistor.

14. The electronic device of claim 11, wherein a return loss of the signal measured at the antenna port is controlled based on capacitance formed by connecting in parallel a first capacitor formed between the first transmission line and the third transmission line, a second capacitor formed between the first transmission line and the fourth transmission line, and a third capacitor formed between the via hole and the fifth transmission line.

15. The electronic device of claim 11, wherein the fifth transmission line is formed by a plurality of vias.

* * * * *